(12) United States Patent
Redmann et al.

(10) Patent No.: US 7,212,983 B2
(45) Date of Patent: May 1, 2007

(54) METHOD AND APPARATUS FOR PROVIDING VISITORS WITH A PERSONALIZED ITINERARY AND MANAGED ACCESS TO ATTRACTIONS

(76) Inventors: William Gibbens Redmann, 1202 Princeton Dr., Glendale, CA (US) 91205; Michael Anthony Eaton, 5991 Killarney Ave., Garden Grove, CA (US) 92845

( * ) Notice: Subject to any disclaimer, the term of this patent is extended or adjusted under 35 U.S.C. 154(b) by 1200 days.

(21) Appl. No.: 09/858,376

(22) Filed: May 15, 2001

(65) Prior Publication Data

US 2002/0174003 A1 Nov. 21, 2002

(51) Int. Cl.
G06Q 10/00 (2006.01)

(52) U.S. Cl. .......................................... 705/6

(58) Field of Classification Search ............... None
See application file for complete search history.

(56) References Cited

U.S. PATENT DOCUMENTS

| | | | |
|---|---|---|---|
| 3,999,050 A | 12/1976 | Pitroda | |
| 4,149,330 A | 4/1979 | Huff | |
| 4,715,010 A | 12/1987 | Inoue et al. | |
| 4,774,697 A | 9/1988 | Aihara | |
| 4,780,839 A | 10/1988 | Hirayama | |
| 4,890,258 A | 12/1989 | Tsugei et al. | |
| 5,066,853 A | 11/1991 | Brisson | |
| 5,129,057 A | 7/1992 | Strope et al. | |
| 5,199,104 A | 3/1993 | Hirayama | |
| 5,245,163 A | 9/1993 | Bar-Yehuda | |
| 5,287,269 A | 2/1994 | Dorrough et al. | |
| 5,408,417 A | 4/1995 | Wilder | |
| 5,502,806 A | 3/1996 | Mahoney et al. | |
| 5,546,326 A | 8/1996 | Tai et al. | |
| 5,559,707 A | 9/1996 | DeLorme et al. | |
| 5,619,695 A | 4/1997 | Arbabi et al. | |
| 5,659,768 A | 8/1997 | Forbes et al. | |
| 5,724,520 A | 3/1998 | Goheen | |

(Continued)

FOREIGN PATENT DOCUMENTS

GB 2 228 123 * 8/1990

OTHER PUBLICATIONS

Anonymous; Queue without waiting; Feb. 26, 2001; Electronics Times, p. 40; dialog copy 2 pages.*
U.S. Appl. No. 09/617,721, filed Jul. 17, 2000, Laval et al., Known from CIP app.

*Primary Examiner*—Thomas A. Dixon

(57) ABSTRACT

A method is disclosed for creating itineraries for a party of visitors to a facility, the facility having multiple attractions. Visitors give answers to questions about their preferences, which is combined with authoritative information about their admission privileges, and information stored about the attractions and facility, to generate an itinerary. The method can be executed by a portable, handheld computer which asks the questions, accepts the answers, and processes them into an itinerary which is both portable and dynamic, adjusting in real time to schedule changes and unscheduled attraction closures. In an alternative embodiment, the itinerary can be generated as the result of an Internet transaction, or through an interaction with a facility employee. The itinerary may be presented to the party in printed form, such as a schedule or ticket book. If a facility has an access control system that uses a central database, the itinerary can generated as records in the database, thereby allowing parallel use of prior art access methods.

25 Claims, 15 Drawing Sheets

U.S. PATENT DOCUMENTS

| | | |
|---|---|---|
| 5,842,145 A | 11/1998 | Zimmer |
| 5,850,617 A | 12/1998 | Libby |
| 5,890,134 A | 3/1999 | Fox |
| 5,911,134 A | 6/1999 | Castonguay et al. |
| 5,938,721 A | 8/1999 | Dussell et al. |
| 5,940,803 A | 8/1999 | Kanemitsu |
| 5,974,391 A | 10/1999 | Hongawa |
| 5,978,770 A * | 11/1999 | Waytena et al. ............... 705/5 |
| 5,987,420 A | 11/1999 | Maeda et al. |
| 5,987,421 A | 11/1999 | Chuang |
| 6,046,689 A | 4/2000 | Newman |
| 6,144,971 A | 11/2000 | Sunderman et al. |
| 6,173,209 B1 | 1/2001 | Laval et al. |
| 6,208,934 B1 | 3/2001 | Bechtolsheim et al. |
| 6,748,364 B1 | 6/2004 | Waytena et al. |

* cited by examiner

| Link Nodes | | Link Attributes | | Travel Time | |
|---|---|---|---|---|---|
| Start | Stop | Direction | Barrier | Fast Group | Slow Group |
| 1 | 2 | one-way | none | 90 | 120 |
| 2 | 3 | one-way | none | 30 | 60 |
| 2 | 4 | two-way | none | 45 | 90 |
| 4 | 5 | two-way | none | 45 | 90 |
| 5 | 6 | two-way | none | 30 | 45 |
| 6 | 7 | two-way | none | 30 | 45 |
| 5 | 8 | two-way | none | 45 | 90 |
| 8 | 9 | two-way | none | 45 | 90 |
| 9 | 10 | two-way | none | 45 | 90 |
| 9 | 20 | two-way | none | 45 | 90 |
| 9 | 21 | two-way | none | 45 | 90 |
| 10 | 11 | two-way | none | 45 | 90 |
| 10 | 15 | two-way | none | 45 | 90 |
| 11 | 12 | two-way | none | 45 | 90 |
| 11 | 14 | two-way | none | 30 | 45 |
| 12 | 13 | two-way | none | 45 | 90 |
| 13 | 14 | two-way | none | 30 | 45 |
| 13 | 16 | two-way | none | 30 | 45 |
| 14 | 15 | two-way | none | 30 | 45 |
| 14 | 17 | two-way | none | 30 | 45 |
| 15 | 18 | two-way | none | 45 | 90 |
| 16 | 17 | two-way | none | 45 | 90 |
| 17 | 18 | two-way | none | 45 | 90 |
| 18 | 19 | two-way | none | 45 | 90 |
| 19 | 20 | two-way | none | 45 | 90 |
| 19 | 22 | two-way | none | 45 | 90 |
| 19 | 23 | two-way | none | 45 | 90 |
| 21 | 22 | two-way | none | 45 | 90 |
| 23 | 24 | two-way | none | 45 | 90 |
| 23 | 29 | two-way | none | 30 | 45 |
| 23 | 30 | two-way | wheelchair only | 180 | 240 |
| 23 | 32 | two-way | no wheelchair | 90 | 120 |
| 24 | 25 | two-way | none | 45 | 90 |
| 25 | 26 | two-way | none | 30 | 45 |
| 26 | 27 | two-way | none | 30 | 45 |
| 27 | 28 | two-way | none | 45 | 90 |
| 26 | 29 | two-way | none | 45 | 90 |
| 30 | 31 | two-way | wheelchair only | 180 | 240 |
| 31 | 35 | two-way | wheelchair only | 60 | 120 |
| 32 | 33 | two-way | no wheelchair | 90 | 120 |
| 33 | 35 | two-way | no wheelchair | 90 | 120 |
| 34 | 35 | two-way | none | 45 | 90 |
| 34 | 36 | two-way | none | 45 | 90 |
| 36 | 37 | two-way | none | 45 | 90 |
| 37 | 38 | two-way | none | 45 | 90 |
| 37 | 39 | two-way | none | 45 | 90 |

Figure 9

| Attraction Name | Attraction Description | Scheduling Factors | | | | | | Acceptance Factors | | | | | |
|---|---|---|---|---|---|---|---|---|---|---|---|---|---|
| | | Entry Node | Exit Node | THRC | Showtimes | Duration | Queue | Violence | loud | get wet | Kid Entertainment | Height Limit | W/C transfer req'd | Bores Kids |
| Water Park | stunts and hydrotechnics | 7 | same | 3000 | 4 | 20 | 20 | x | x | | | | | |
| StudioWorld Tour | see a real studio in action | 28 | same | 1600 | 0 | 90 | 30 | | x | | | | | |
| Termination | enveloped by the action! | 12 | 16 | 2000 | 0 | 25 | 60 | | x | | | | | |
| Wild West Stunt Show | cowboy stunts & shootout | 15 | 20 | 2000 | 4 | 20 | 15 | x | x | | | | | |
| T-Rex Ride | escape from the T-Rex | 35 | same | 2000 | 0 | 15 | 45 | x | | | | x | x | |
| Flamination | making movie pyrotechnics | 38 | same | 1200 | 0 | 15 | 20 | | x | | | | | |
| The Future World | rip into the past and future | 29 | same | 2000 | 0 | 15 | 60 | | x | | | x | x | |
| Academy Winners | gowns of the greats! | 36 | same | 200 | 0 | 15 | 0 | | | | | | | x |
| Filmmaking 101 | audience participation show | 39 | same | 900 | 0 | 30 | 15 | x | | | x | | | |
| Fly to the Moon | flying carpet to Luna | 34 | same | 1500 | 0 | 10 | 90 | | | | x | x | | |
| Tomb of Doom | scary maze of terror | 5 | 10 | 500 | 0 | 10 | 20 | x | | | | | | |
| Animals on Stage | performing animals show | 19 | same | 2000 | 3 | 30 | 15 | | x | | x | | | |
| Splashdown! | wet fun park | 25 | same | 2000 | 0 | 30 | 0 | | | x | | x | | |
| Ralph & Bob | cartoons on stage | 21 | 9 | 1000 | 4 | 20 | 20 | | | | | | | |
| Everybody March | parade of show tunes | list A | same | 10000 | 2 | 30 | 30 | | x | | | | | |
| KABOOM! | fireworks spectacular | list B | same | 20000 | 1 | 15 | 15 | | | | | | | |
| Jazz on Parade | singin' & dancin' | 8 | same | 500 | 6 | 15 | 0 | | | | x | | | |
| Cartoon-o-rama | cartoon antics live | 36 | same | 500 | 4 | 15 | 0 | | | | | | | x |
| Entrance | your day begins here | 1 | same | 7500 | 0 | 0 | 0 | | | | | | | |
| Exit | can't wait to see you again! | 3 | same | 10000 | 0 | 0 | 0 | | | | | | | |

| List A | |
|---|---|
| Node | Delay |
| 5 | 360 |
| 6 | 360 |
| 8 | 360 |
| 9 | 240 |
| 19 | 120 |
| 20 | 240 |
| 23 | 0 |
| 29 | 0 |

1110'  1120'                   1100'

| List B | |
|---|---|
| Node | Delay |
| 16 | 0 |
| 23 | 0 |
| 29 | 0 |
| 30 | 0 |
| 31 | 0 |
| 32 | 0 |
| 33 | 0 |
| 34 | 0 |
| 35 | 0 |
| 36 | 0 |
| 37 | 0 |
| 38 | 0 |
| 39 | 0 |

Figure 11

| Profile Elements: | Slow Group | Barrier | violence | loud | get wet | Kid Entertainment | Height Limit | W/C transfer req'd | Bores Kids |
|---|---|---|---|---|---|---|---|---|---|
| Large Group (>5) | x | | | | | | | | |
| Have Small Children | x | | | | | | + | | - |
| Have Infant | x | | | | | | | o | - |
| Baby Swapping | | | | | | | | | |
| Wheelchair | x | x | | | | | | | |
| Wheelchair transfer | | | | | | | | o | |
| Phobia: Violence | | | - | | | | | | |
| Phobia: Loud | | | | - | | | | | |
| Phobia: Water | | | | | - | | | | |

Figure 12

|  | Attraction | | |
|---|---|---|---|
|  | AA | BB | CC |
| Desirability under profile A | 5.0 | 7.0 | 8.0 |
| Desirability under profile B | 7.0 | 5.0 | 8.0 |

Fuzziness of perturbation: 1.0

Most desirable attraction under profile A

| Attraction | Unperturbed | Perturbed |
|---|---|---|
| AA | 0 | 0 |
| BB | 0 | 21 |
| CC | 100 | 79 |

Most desirable attraction under profile B

| Attraction | Unperturbed | Perturbed |
|---|---|---|
| AA | 0 | 24 |
| BB | 0 | 0 |
| CC | 100 | 76 |

Most desirable attraction under aggregated profiles

| Attraction | Unperturbed | Perturbed |
|---|---|---|
| AA | 0 | 24 |
| BB | 0 | 21 |
| CC | 200 | 155 |

Figure 13

METHOD AND APPARATUS FOR PROVIDING VISITORS WITH A PERSONALIZED ITINERARY AND MANAGED ACCESS TO ATTRACTIONS

FIELD OF THE INVENTION

The present invention relates generally to a system for creating a personalized itinerary, and in particular, a system to create a personalized itinerary for visitors to a facility, such as a zoo, theme park, historic area, or shopping district. More particular still, the invention relates to a system for creating a personalized itinerary for visitors to a facility that provides managed access to attractions at the facility.

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICE APPENDIX

Not Applicable

BACKGROUND OF THE INVENTION

A tourist wants to see and do the most interesting things available, with a minimum of inconvenience. The tourist wants fond memories of his visit, and maybe more importantly, he wants great stories to tell when he returns home.

A significant portion of a facility's future business comes from the word-of-mouth marketing that it earns by providing tourists with an experience that makes those great stories. Tourists returning with fabulous tales of their own exploits inspire the next season's tourists to venture forth and have those experiences for themselves.

A facility may contain many attractions. Individual rides, restaurants, exhibits, stores, shows, etc. are all part of the value a tourist can experience at a facility. Besides the individual attractions a facility might contain, a facility commonly provides collateral materials such as maps and show schedules.

Too often, this collateral material hits the tourist with a barrage of comic book action balloons: "New!," "Must See." Pages and pages of tables showing services, menus, merchandise, age appropriateness, and height restrictions are presented in a dazzling array of color and iconography.

Unfortunately, this frequently amounts to information overload. Its effect is compounded when a person is a first-time visitor, and again when they are from outside the primary marketing region of the facility (and so are unfamiliar with many of the facility's attractions), and again when there is the barrier of a language difference.

Guided tours are very effective in overcoming an unfamiliar visitor's lack of knowledge. The facility's highlights can be put together into a coherent sequence. The tour guide can be responsive to the needs of the tour's members (more so when the tour group is small). Often, the tour guide is fluent in the visitor's native language, which makes the experience less demanding on the visitor, in turn making them more comfortable. There is, however, a significant cost associated with assembling and maintaining a trained, multilingual pool of qualified tour guides whose utilization will fluctuate, depending on daily attendance and visitor arrival times.

Thus, self-guided tours are common. A simple printed brochure can provide instructions for getting from attraction to attraction, and call out points of interest between them. Audio walking tours, such as those produced by Antenna Audio (Sausalito, Calif.), play a sound track of directions. Their exemplary production of Alcatraz: Cellblock Tour for Alcatraz Island in San Francisco Bay, California, is an audio tour which includes binaural, dramatized productions of prison breaks and encounters with famous inmates. Such tours play on simple audio cassette or CD players over headphones.

The drawback of the printed brochure and audio walking tour is that there is little ability to customize the tour for each visitor. True, the brochures and audio programs can be presented in multiple languages. Both can be taken at a slowed pace—the brochure will wait for the reader's pace, and the audio track can be paused or rewound. But they are inherently linear. Every visitor will follow the same track and have the same experience. There is no ability to customize the experience depending on type of interest or time of entry. If someone enters late in the operating day, the program cannot abbreviate the tour and emphasize the important elements. Should a party include young children, a different selection of shows or exhibits appropriate to their age level cannot be selected.

Interactive audio systems, such as the Inform Wand manufactured and programmed by Acoustiguide Corporation (New York, N.Y.), allow visitors to browse a facility randomly. These systems are used in such facilities as the Louvre in Paris and San Diego Zoo in California. The interactive audio tour systems have limited ability to guide visitors. Typically, one audio track may end with a recommendation for a subsequent track to be played, or item to be examined. As a visitor proceeds through a facility, rooms or areas are tagged with ID numbers and are described in like-numbered audio tracks. Within such areas, visitors wishing more detailed information may enter ID numbers related to individual items or displays. The system is reactive to a visitor encountering a location or item, rather than directing them.

There is a need for a tool or method by which a visitors' interests and abilities, and the temporal situation, can be understood and an appropriate itinerary within the facility created for them.

Prior Art Relating to Attraction Access

Other factors can come into play and degrade a visitor's experience. Long waits in queue are a chief reason certain portions of the population avoid some facilities.

The Walt Disney theme parks make use of a system called FASTPASS® described by Laval et al. in U.S. Pat. No. 6,173,209. Visitors to a park can either enter the regular queue for an attraction, or they can obtain an express pass to use the express queue. The express pass has a time period during which it is valid. The visitor must present the express pass during the indicated time period in order to bypass the queue and be admitted to the attraction. Obtaining an express pass is achieved by the visitor presenting an ID of some sort, to a kiosk near the ride. An express pass is issued, bearing the next available reservation time. No further express passes will be issued to an ID until the existing express pass has expired. Thus, a "first-come, first-served" virtual queue is created, and the visitor can be in only one virtual queue at a time.

Other systems for managing queue times allow visitors to select a series of attractions in order to make reservations. Mahoney et al. in U.S. Pat. No. 5,502,806 provides computer terminals for visitors having an ID to make and edit reservations. Turnstiles are equipped with ID readers and so can admit or deny admission to the visitor based on having a timely reservation on the attraction.

In both Laval et al. and Mahoney et al., visitors not having reservations are permitted to line up in a physical queue for the attraction. The attractions are configured with dual approaches. One is a long, physical queue suitable for the visitors who may be waiting over an hour for access to the attraction. The other is a relatively short queue having a gate that admits patrons whose reservations are current, and have thus been waiting in a virtual queue.

The advantage of virtual queuing is significant. While guests are waiting in a virtual queue, they can either be simultaneously enjoy other attractions, shop, or simply relax nearby.

A disadvantage of such systems, however, is that the visitor must either know to visit an attraction to claim a spot in the virtual queue (under Laval et al.) or they must know what attractions to select from the terminal (in Mahoney et al.) It may well be the case that a novice visitor has little or no idea where specific attractions are located (and thus is frustrated in trying to arrive in person to make a reservation). It can also be the case that he is not familiar with the array of attractions available, and thus cannot quickly and efficiently make knowledgeable attraction selections. Further, unless stringent restrictions are imposed, it can be the case that the reservations made by the overanxious visitor cannot actually be kept, as when two consecutive reservations are made for widely separated attractions.

In years past, Disneyland Park (Anaheim, Calif.) made use of ticket books which contained a collection of tickets graded from 'A' to 'E'. These books were sold with one's admission. An 'A' ticket was viable admission to any 'A' rated attraction. A 'B' ticket was viable admission to any 'A' or 'B' attraction. Typically, the most elaborate and most current attractions bore an 'E' designation and the only viable admission was an 'E' ticket (which became part of the industry vernacular long before the Internet popularized e-Anything!).

By providing a limited supply of 'E' coupons to each visitor, Disneyland operations was able to restrain excessive demand for 'E' attractions. The ticket books were arranged to clearly display what tickets designations remained, and what attractions fell into these designations.

Another disadvantage of systems like Laval and Mahoney, is that they do not mitigate unequal demand for various attractions. An extremely popular attraction may find that its FASTPASS® reservations for the entire operating day are dispensed within an hour of the facility's opening. Meanwhile, other attractions may not exhaust their allotment of reservations.

With such an imbalance of demand, the system of Mahoney et al. will fail as late arriving visitors find that there are no reservations available for any of the 'E' attractions, or even 'D's.

A system and method is needed which will redistribute demand for attractions efficiently, so that a facility is better able to spread demand for its attractions. Further, this would help to limit the adverse impact that a virtual queue size has on a physical queue progress.

Prior Art Relating to Itinerary Generation

A variety of route planning and navigation systems is presently available. These are available both in stationary and portable devices, and can operate standalone or connected, perhaps wirelessly, to a network (such as the Internet). Route planning systems, such as ROADNET 5000® by UPS Logistics Technologies, Inc. (Baltimore, Md.), permits fleets of trucks to efficiently deliver parcels to their destination. Users of America Online, Inc's (Dulles, Va.) mapping services Internet site, www.mapquest.com, or Street Atlas USA™ software on CD-ROM by DeLorme (Yarmouth, Me.), can get point-to-point driving instructions from their desktop computer, or wireless Internet device. In car navigation systems, such as Hertz (Park Ridge, N.J.) NeverLost™, use GPS satellites, an electronic compass, and a geographic database to provide verbal directions to a requested address: "At the next intersection, turn right."

Such systems are, in part, commercial outgrowths of various solutions to a classic optimization problem from computer science called the "Traveling Salesman Problem," or "TSP". The problem is to find the most efficient path that visits each desired destination exactly once, and minimizes the total distance traveled. Many optimized solutions to this problem have been presented in the literature, for example, Donald Knuth (1973) The Art of Computer Programming: Sorting and Searching (vol III). Such solutions are very effective for small or moderate numbers of destinations, such as are encountered in the course of itinerary preparation.

Typically, a TSP solution involves building a graph topologically representative of the set of destinations and the physical pathways between them (e.g. walkways, roadways, rail lines, airline flights, etc.) as appropriate. Each pathway is ascribed a "cost", perhaps representative of travel time, distance, expense, physical difficulty (as might be pertinent to a hiking trip), or other factors, or a combination thereof. Ultimately, an algorithm is employed to minimize the total "cost" of the overall trip. This would, based on whatever factors were included in the cost, result in the minimization of time, distance, expense, difficulty, etc.

A variation of the TSP problem, called the "Bottleneck TSP" includes a maximum cost limit, such that no path with a cost higher than the limit is permitted in the solution. Such a variation is useful to specify, for example, that an oversized load must be routed only along roads that have sufficient vertical clearances, or that a traveler in a wheelchair should not receive an itinerary directing him to traverse a rampless flight of stairs.

Efficient route planning systems that deal with large numbers of possible targets and having highly optimized computational performance, have been developed. An example is Libby, in U.S. Pat. No. 5,850,617

Specialized, commercial systems have been developed to assist a tourist, or his travel agent, in preparing itineraries. Such systems collect from a prospective traveler a list of desired destinations. The system then sequences those destinations to produce an efficient outcome. An example of such software is TripMaker Deluxe 2000, by Rand McNally (Skokie, Ill.), and similar capabilities are available on their web site at www.randmcnally.com.

In U.S. Pat. No. 5,940,803, "Itinerary Making System" Kanemitsu describes a system which allows selection from a list of destinations, such as a particular museum or a specific beach. In addition, it requires a visiting purpose, such as to appreciate art or to watch the sun set, respectively. With each destination-purpose pair is associated the allowable times, as well as a recommended visiting time. For a museum, allowable times might be the operating hours of the park, however, the recommended time may be a time when crowds have historically been particularly light. For watching the sunset at the beach, the allowable and recommended times may coincide: beginning about a half hour before sunset, local time. Kanemitsu describes a number of convenience features that permit ease of destination and purpose entry. By associating destinations with a variety of categories, his system is often able to assume the purpose of a specified visit.

However, as effective as such systems are, and with all the convenience features they carry, such systems do not address certain needs.

A party visiting a facility, unfamiliar or only partly familiar with its collection of attractions, is at a disadvantage. A significant effort must be expended to determine which attractions are suitable for the party's needs, limitations, and tastes.

Someone unfamiliar with Disneyland may well wonder whether "Fantasmic" is a turbulent roller coaster, a song-and-dance gala stage presentation, or a fireworks show. It is the latter, but how long will it take a visitor to determine that? Is it suitable for an infant? Will grandmother have to transfer from her wheelchair? If the attraction operates on a schedule, when must the party enter the queue? It would take a long time to assimilate and consider the rest of the 60 attractions at Disneyland to determine a short list of suitable and most desirable attractions to visit.

A system or method is needed that allows an unfamiliar visitor to receive a near optimal experience, suited to his (or his party's) tastes, schedule, needs, and limitations. The experience should give a proper overview of the facility, so a tourist does not return feeling that they have missed a key element.

In facilities where most guests can stroll about and see attractions in an arbitrary order, efficient distribution and loading can become a key factor for the facility operator.

Some theme parks, for instance, Universal's Islands of Adventure (Orlando, Fla.), are laid out in a ring. Visitors typically proceed clockwise or counterclockwise from the park entry and encounter attractions consecutively. This leads to long waiting times in queues for attractions near the entrance in the morning, and long waits for attractions halfway around the ring near midday, where the clockwise and counterclockwise travelling parties meet.

Summary of Needs Unsatisfied by Prior Art

There is a need for a tool or method by which a party of visitors' interests and tastes can be understood and an appropriate itinerary within the facility created for them.

A system is needed that will consider a party's needs and limitations to create a personalized itinerary for the party, within the facility.

There is a need for a tool or method by which the spatial and temporal situation of the party and of the facility are considered to make a personalized itinerary for the party, within the facility.

There is a need for a system that will allow a visitor unfamiliar with a facility to create a viable set of reservations to access attractions.

A system is needed that will redistribute demand for attractions in a facility—to moderate demand for popular (i.e., 'E') attractions and create demand for other, underutilized attractions.

Similarly, a system is needed that will diffuse demand for attractions within a facility so that excessive demand, perhaps time-of-day dependent demand, or lack thereof, can be moderated.

The present invention satisfies these and other needs and provides further related advantages.

OBJECTS AND SUMMARY OF THE INVENTION

The present invention relates to a system and method for creating a personalized itinerary for visitors to a facility, such as a zoo, theme park, historic area, or shopping district. In addition, the invention relates to a system and method that provides managed access to attractions at the facility.

When a group of people arrives at a facility comprised of many attractions, their experience is optimized if they can proceed throughout the day directly to a next attraction of specific interest to them.

To express their interests, and other party attributes, before beginning the visit in earnest, the party, or its representative, completes a profile.

Such a profile would be comprised of many factors, each representing information such as the number of people in the party, whether there are any infants, children, disabled, or elderly members in the party. The profile might contain information concerning the party's preferences, such as interest or aversion to thrill rides, or to particular themes. For instance, visitors to an historic site might express a disinterest in military history, or more generally, a party might specify an aversion to violence, whether depicted in a movie or ride as entertainment, or recounted in an historic exhibit.

The specific queries made concerning the party's interests are preferably general. It is sometimes appropriate that certain responses warrant a more detailed query. For example, a party indicating that one of their members is in a wheelchair might be queried whether that individual is capable of transferring without assistance into a ride vehicle. A party indicating that it has an infant may be queried whether it will split up and take turns seeing certain infant-inappropriate attractions.

A profile may also include as a factor the access class of the party. This may be derived from the party's admission media (e.g. did they purchase a special ticket vs. a regular admission) or they may be otherwise entitled to special treatment (e.g. they are VIP guests of the facility). Such a factor is likely to be entered into the profile by a facility employee, or other secure means.

Each attraction within a facility is rated against each factor or certain combinations of factors, in the profile. A historic recreation of the gunfight at the OK Corral might be rated low, that is, as a poor match, for parties with an aversion to violence. A roller coaster might be rated low for a party with an infant, unless they have indicated that they are willing to split up and ride in turns. Attractions with a strong link to a chosen theme are more highly rated. For instance if visitors to a movie studio indicate an affinity to the theme "How Movies are Made", attractions which emphasize that theme, other things being equal, are rated more highly than attractions which do not.

Such ratings are preferably created by regression analysis. A collection of candidate questions for collecting profile factors is generated. Facility guests, or members of a focus group, answer the candidate questions. They also complete a rating for each attraction at the facility (or for attractions at other facilities which may be analogous to attractions being contemplated for development.) Once a suitably large number of responses to this procedure have been obtained, those questions which most effectively distinguish among the attractions are selected, and the influence on the rating of each attraction is determined.

Alternatively, ratings of the attractions can be generated by someone with a priori knowledge. It can be known that certain attractions are violent, unsuitable for infants, strongly linked to certain themes, etc. Such an individual may develop a collection of factors that adequately represent a party's limitations and interests, and relate these to each attraction.

Optionally, the distribution of factors of the average party, and the resulting relative rating of attractions by this method is tallied. This distribution of factors is preferably anticipated. Actual measurement each day is useful primarily for future anticipation. The distribution of factors can vary dramatically by season, or even by day. The parties visiting during the summer, on average, will have a different distribution of factors than parties visiting in the off-season, for example because visitors during the off-season may contain more retired individuals. The visitors to a facility on weekends may include many more families and children, while the visitors midweek may be more adult groups.

By this method, the entire collection of attractions can be ranked for each party by virtue of the ratings each attraction receives for the factors in the party's profile. That is, first a party, or its representative, completes a profile. Next, the rating is determined for each attraction in the facility from the factors comprising the party's profile. The attractions can be ranked from high to low, based on the rating thus derived.

An itinerary is comprised of events. An event is typically a visit to an attraction at a scheduled time. This is not necessarily a reservation, though it can be. It is a time at which the party is recommended to visit an attraction.

Once the attractions are ranked, an itinerary can be generated. The itinerary will consist of a sequence of events. Many of the events will be times to visit selected attractions. Attractions are selected to give preference to those receiving a higher rating. Attractions in lower ranks are generally less likely to be included. Attractions in the lowest rank would not ever be included, as these certainly violate some clearly stated preferences or limitations in the profile.

Such an itinerary preferably has additional attributes appropriate to the party. If the party is large, is managing an infant or a number of children, or has another factor than may contribute to a limited speed of travel, additional time may be required to move from attraction to attraction. Therefore, the itinerary may schedule more time between events.

If an itinerary is also generated to take into account the routing between attractions, it may allocate more time between events for parties whose profile indicates certain access limitations. That is, if a party requires access to an elevator or a route that avoids a particularly steep grade, the route indicated may require more time.

The itinerary can include in event timing a consideration of traffic for the party in transit, and for the queue length anticipated at the attractions. Such traffic and queue considerations can be variable by time (e.g. "rush hour" or a "lunchtime rush").

The itinerary can adjust for a party's access class. Certain advantaged facility visitors may receive a "first class" or "VIP" preference. Such parties may have preferential access to shorter queues or other features. Additionally, some parties may have access to modes of transportation which shorten the time required between attractions (e.g. some parties may have access to electric carts for touring an historic battleground, while other visitors have elected to walk).

It may also be the case that certain attractions are accessible only to visitors having a certain access class. For example, an autograph session with a famous personality, or specially guided tour, may be limited only to purchasers of a particular class of admission to the facility.

On a given day, an expectation of the distribution of profiles can be generated. This can come from a statistical analysis of historical data, or can be merely postulated (the former is likely to be more meaningful).

The expected distribution of profiles can be used to produce an expected average rating for the attractions. The number of individuals expected in these parties having these expected profiles can be calculated. "Directed demand" is the number of visitors directed to an attraction by the itineraries produced by this invention. It includes the fact that an itinerary is generated for a party, and that a party may consist of multiple visitors.

It is plausible for certain attractions to be suitable, and in fact desirable, to virtually all parties. "Everybody loves a parade," so it is said! In such a case, it may be found that the rating for such an attraction is very high for all parties likely to visit the facility. In cases where such an attraction is overly likely to be highly rated, the itinerary generating mechanism is overly likely to select it for inclusion in the itinerary. It may be the case that such a directed demand would exceed the capacity of the attraction. Alternatively, it may exceed some other established limit, such as a portion of the attraction's capacity allocated to visitors using the itineraries of this invention.

One preferable method for preventing this capacity overrun is to attenuate the rating of that attraction by a factor sufficient to reduce the anticipated itinerary demand to an amount such that the allocated capacity should be sufficient. By statistically lowering the likelihood of an attraction to be selected for inclusion in an itinerary, the directed demand can be moderated. This versatile technique can be used in situations where allocated capacity is soft, that is, where visitors following itineraries represent only a portion of an attraction's capacity. While it is desirable for the directed demand to stay close to the allocated portion of the attraction capacity, if directed demand were to be slightly lower or higher, the attraction would absorb the deviation by slightly speeding up or delaying its primary queue, respectively.

Another method for preventing this capacity overrun is to pre-allocate a limited number of events that may be scheduled for an attraction within a particular time window. An itinerary is built with the additional knowledge of how many of these events remain available for each acceptable attraction at various times. This allows itineraries to be built which deal with attractions having discrete, absolute limits on capacity. For example, accessing a tram tour which has room for precisely ten people and one wheelchair, and no more.

It is possible to use this invention in conjunction with other attraction access control systems. For example, it could be used in parallel to a system such as Laval et al., whereby some fraction of the attraction capacity allocated to the virtual queue is instead allocated to the itinerary making system of the present invention. Thus, some fraction of visitors could be operating from an itinerary (essentially a timed, self-guided tour), and thereby access the attractions as if they held positions in the virtual queue.

This invention also makes it possible for visitors unfamiliar with a facility to make meaningful use of a queue management system as in Murphey et al., or any of the itinerary making systems otherwise described. These normally require the user to enter or select explicitly each attraction that they wish to visit. By application of this invention, such systems can be employed to create meaningful, satisfying itineraries for guests not familiar with a facility's detailed offerings.

In addition to the above, it is an object of this invention to accommodate attractions of various types. This includes specifically located attractions, such as rides, lookout points, diffusely located attractions such as a fireworks display or parade, or multiply located attractions such as shopping or dining. It includes discretely scheduled attractions, such as theaters with specific show times, continuously available attractions (e.g. a fountain), and attractions with limited availability (e.g. a trail that closes ½ hour before sundown).

It is further an object of this invention to present marketing promotions to a party, to promote certain venues or the sale of certain merchandise, at times when a party is proximal to it, or the promotion is otherwise deemed appropriate. It may be a factor incorporated in the party's profile whether such marketing promotions are presented.

It is a further object of this invention to present opportunities for activities to fill the time between events in the itinerary. For example, when there is a significant amount of time before the next itinerary event, a recommendation may be made to shop, dine, or make a rest stop.

It is an object of some embodiments of this invention to permit an itinerary to dynamically accommodate a missed event. For instance, if a party should become delayed and miss a showtime, or if an attraction should be unavailable because of unscheduled inoperation, the balance of the itinerary can be recomputed so that the party is minimally inconvenienced. Such a recalculation would simply employ the method for creating a new itinerary, but could place in the lowest ranking all attractions which had already been visited.

It is an object of some embodiments of this invention to permit an itinerary to dynamically accommodate an interruption in the sequence of events. If a child in the party is suddenly ill, or if a diaper needs to be changed, or if some other distraction (a meal or another attraction) derails the party, the balance of the schedule can be recomputed, as described above.

It is an object of this invention to provide a party with an itinerary which strictly adheres to a factor representing a departure time. Such a feature is key for visitors who have arrived via tour bus having a departure time, or who have a responsibility to keep some other externally scheduled appointment.

It is an object of this invention to permit a facility operator to diffuse demand for attractions within the facility.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which:

FIG. 9 illustrates a link database representing the exemplary facility map of FIG. 8;

FIG. 10 illustrates an attraction database representing attractions at exemplary facility of the map of FIG. 8;

FIG. 11 shows a node list database representing aggregations of nodes at which the associated attraction can be experienced;

FIG. 12 shows an exemplary profile interpretation database illustrating the relationship between data elements of a party profile and link and attraction database fields;

FIG. 13 shows tables which demonstrate the effect of a diffusion function on demand for attractions;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

The method of the present invention can be implemented using a general purpose computer, or a portable handheld computer, or as an Internet or other network based service. The preferred embodiment uses a portable handheld computer, for example, those which implement the Palm OS by Palm Inc. (Santa Clara, Calif.). This preferred embodiment is described first below. Subsequently, a description is given as to how the other embodiments are implemented, and thus make those alternative implementations obvious to those skilled in the art.

Further, the method of the present inventions is appropriate to implementation in a facility whether or not that facility has in place existing access control systems. The method can be employed to improve the operation of existing access control systems.

A facility, as used in this document, is an entity having a collection of attractions that is visited by parties seeking to experience those attractions. A theme park, historic area (e.g. a battlefield, a ghost town), shopping district, a zoo, a national park, are all good examples of a facility.

Attractions are those rides, shows, shops, restaurants, tours, trails, presentations, displays, viewpoints, picnic sites, and other specific features that are to be experienced by the facility's visitors.

A party consists of one or more visitors operating as a coherent group for the purpose of the itinerary.

Figure 1:
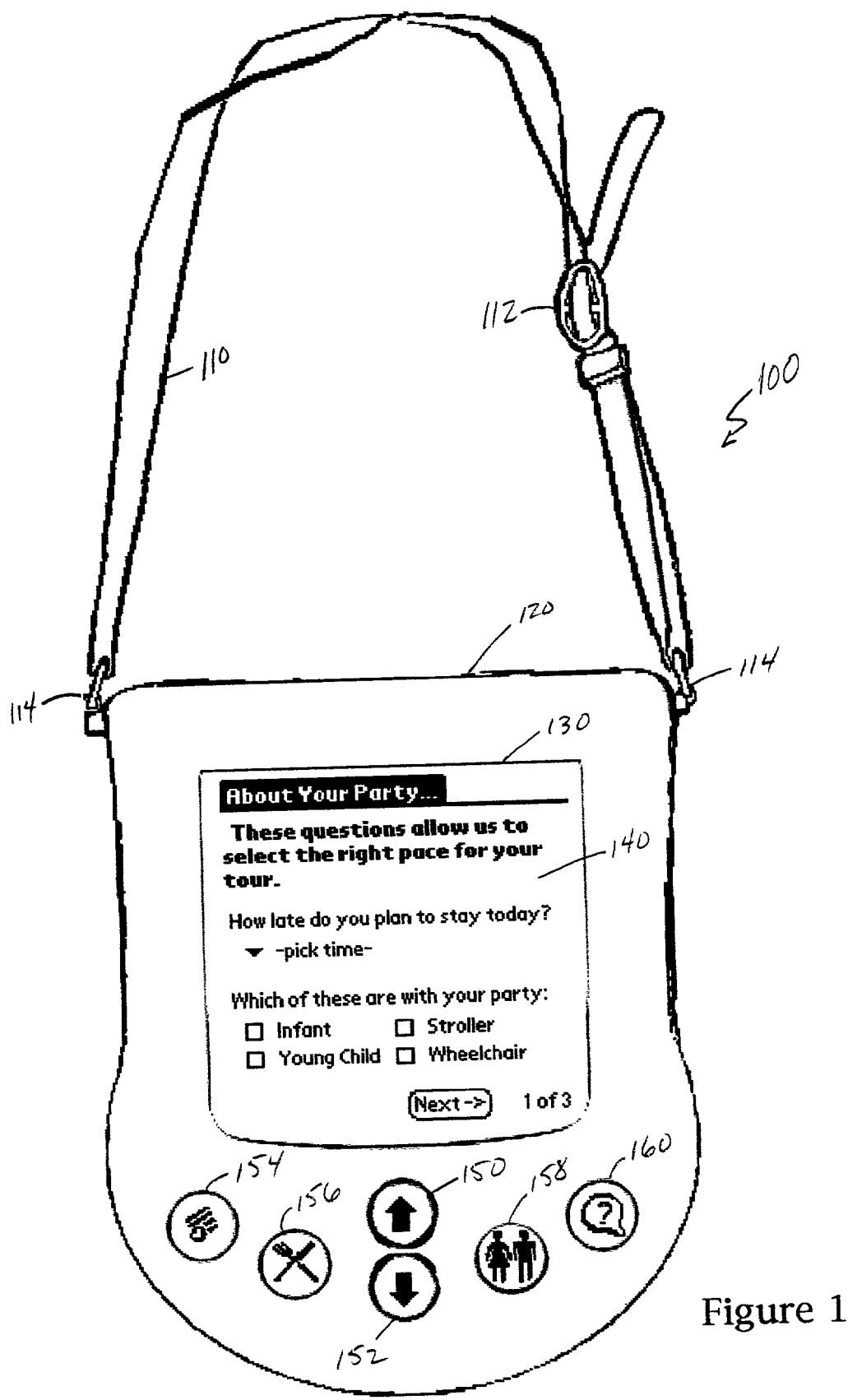
FIG. 1 illustrates an exemplary portable computer gathering information about a party in accordance with the principles of the present invention.

Referring to FIG. 1, in the preferred embodiment, a party arriving at a facility receives a single portable computer 100.

Portable computer 100 preferably has a carrying strap 110, adjustable by the use of buckle 112 and connected to body 120 by pivots 114.

Portable computer 100 has a display screen 130 for asking questions of and providing information to the party. Display screen 130 is overlaid by a transparent, touch sensitive input surface 140.

Portable computer 100 has an internal clock (not shown), sufficient to determine time-of-day, and preferably the current date.

Portable computer 100 has additional buttons 150, 152, 154, 156, 158, and 160, which provide a simple-to-use user interface. An itinerary button 154 calls up the party's current itinerary. A dining button 156 calls up a dialog concerning dining activities. A restroom button 158 calls up information concerning restrooms, water fountains, telephones, or other comfort accommodations. An information button 160 calls up other miscellaneous information such as facility operating hours, maps, database access, shopping information, etc. Scroll buttons 150 and 152 are used to facilitate scrolling of lists or tables of information that do not fit in a single screen. Buttons 150 and 152 scroll such information up or down, respectively. Portable computer 100 preferably enters a power conserving mode when it has detected no user input on either its buttons or touchscreen 140 for a preset period of time, for example, 2 minutes. Preferably, buttons 154, 156, 158, and 160 reactivates the portable computer 100 if it is currently in power conserving mode.

Display screen 130 is used to present various forms for gathering or displaying information. Exemplary forms are shown on display screen 130 in FIGS. 1 through 6. Display screen 130 is preferably legible in strong sunlight. The ability of display screen 130 to provide its own lighting (not shown) is optional, and would be appropriate for use in facilities where low lighting conditions are frequently encountered. Operation of the lighting of display screen 130 would be through a lamp button (not shown) which would call for the lighting to be activated.

Touchscreen 140 is preferably sensitive to an unaided human finger, though use of a stylus is possible. Preferably, touchscreen 140 is protected by a disposable waste sheet (not shown) which covers touchscreen 140 and takes damage, such as scratches and wear, in its stead, but does not inhibit its touch sensing function.

Touchscreen 140 and buttons 150 and 152 are the primary input methods for the visitors to interact with portable computer 100.

Body 120 contains the power supply, memory, processor, display drivers (all not shown), as well as the buttons 150, 152, 154, 156, 158, 160, display 130, and touchscreen 140. Body 120 is sturdy, so as to not break under the type of handling expected by the visitors. Optionally, body 120 may have a hinged cover (not shown) to guard the display 130 and touchscreen 140 when not in active use. Alternatively, a separate case (not shown) may be provided to cover the entire body. Body 120 and all the external components of portable computer 100, are preferably waterproof enough to handle incidents of accidental immersion or splashing as may occur in rain, near fountains, dining rooms, or on water rides.

Portable computer 100 is equipped with an internal battery (not shown) which can either be replaced, or preferably recharged in situ. A variety of interchangeable batteries and battery recharging systems is well known in the art. Most preferable is an inductive charging system (not shown) that permits a recharge of the internal battery without need for external charging contacts (not shown) which is subject to dirt and wear, or the need for a frequently accessed cover plate (not shown) which is subject to loss or breakage. An inductive recharge system provides a cradle which recharges the internal battery whenever the portable computer 100 is inserted. An in situ rechargeable battery requires the least maintenance and handling by the facility's operators.

If the facility offers multiple classes of admission to visitors, e.g. a premium vs. regular admission, then when the party is presented with portable computer 100, it has been configured by the facility's operators with data representative of the party's admission class (e.g. premium vs. regular). Such data will be used in the generation of the party's itinerary. Also, if portable computer 100 is to be used as a form of admission media, the party's headcount or other pertinent admission data would also have been entered.

Optionally, some instances of portable computer 100 can be preconfigured with certain party-specific data, such as admission class. Such instances may have distinct markings, such as a gold colored body 120 for premium class admissions and a black colored body 120 for regular class admissions.

The methods by which such information would be entered are familiar to those skilled in the art, and may take the form described below for visitor-entered data. However, data which must be entered by facility personnel would typically be protected by password or other well known security mechanisms. For instance, access to a form shown on display screen 130 for the entry of the party size may require input of a password or PIN number before a change to party size is accepted. Alternatively, a particular, obscure gesture made on touchscreen 140 may be used to access secret management forms through display screen 130.

Figure 7:
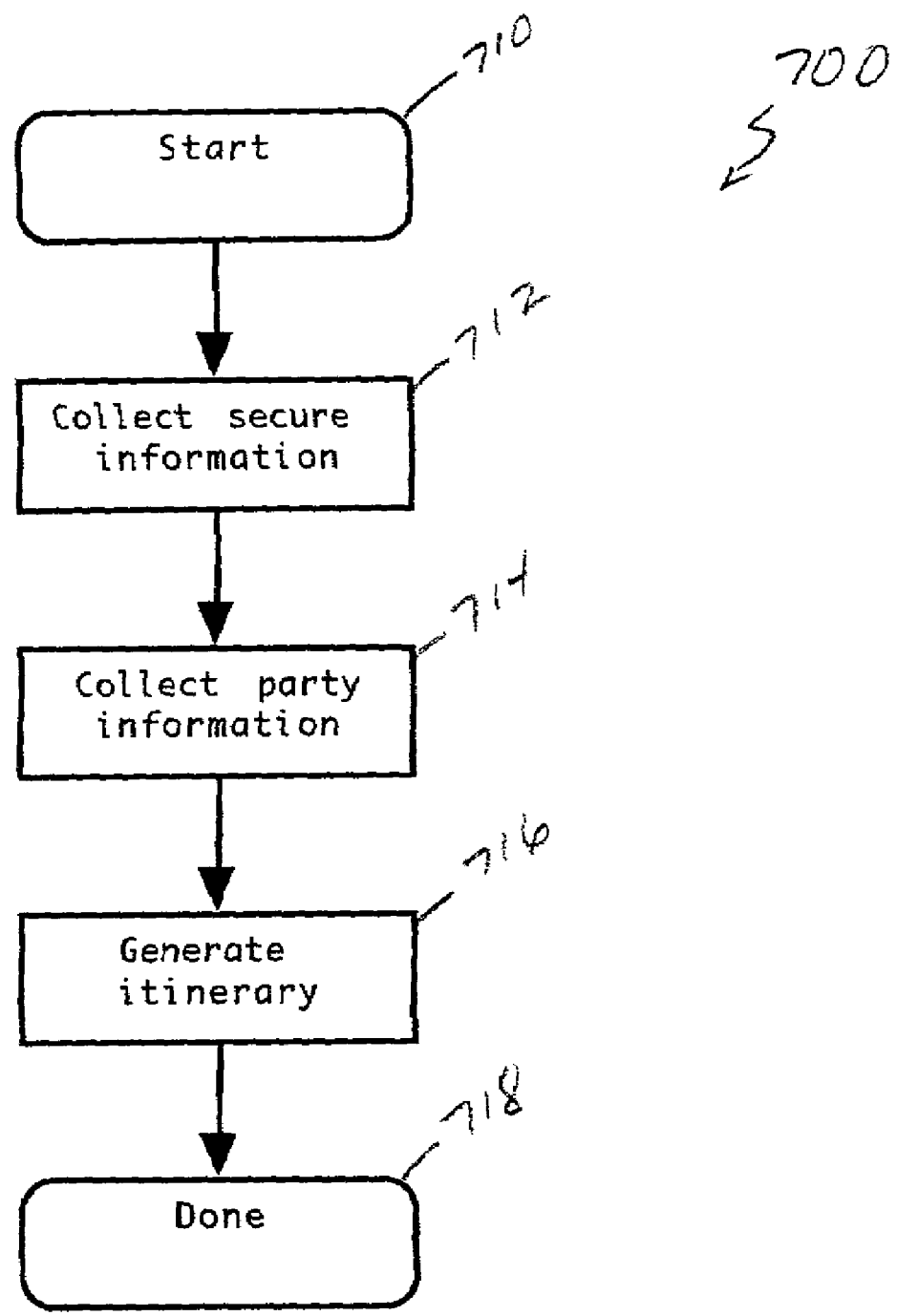
FIG. 7 shows a flowchart of the basic steps involved in making an itinerary according to the present invention.

Referring to FIG. 7, a flowchart for the process of generating an itinerary 700, in accordance with the present invention, is shown. The following are the steps of process 700, interpreted in light of using the portable computer 100 and other elements of the preferred embodiment.

At the start, step 710, the portable computer contains current information about the facility and its attractions. The detailed nature of this information is discussed later. Further, the portable computer contains or generates a suitable random number seed, to be used as subsequently described.

In the next two steps, 712 & 714, data are collected which comprise the party's profile.

As a party presents itself to purchase admission to the facility, or before, an employee or person authorized by the facility operator provides certain secure information, step 712, to the portable computer 100. Secure information consists of such items as the party's admission class and the party's size. It may also include additional information, such as prepaid meals, additional auxiliary admissions purchased (e.g. a special tour or other attraction having an additional admission price). The form for the collection of secure information, step 712, is made accessible to the facility's personnel as described above. The data collected in step 712 is stored in the party's profile.

One piece of secure information that is particularly useful and is preferably collected is the language of preference of the party. For example, a Japanese tourist, though frequently fluent in English, may be more comfortable answering questions and handling an itinerary presented in Japanese. By allowing the language of presentation to be selected by the facility personnel, the confusion that may result from a portable computer 100 that is accidentally switched by a party in a wrong language is avoided.

The portable computer 100 is preferably presented to the party for the collection of the party information, step 714. Alternatively, the party information can be collected and entered into portable computer 100 by facility personnel. In either case, the party information is entered into query forms in the manner described below and stored in the party profile.

Having received all the necessary secure information and party information, the processor (not shown) of the portable computer 100 executes an algorithm (described below) to generate an itinerary, step 716.

The results of the itinerary generation are saved for further reference later, and the process is complete, step 718.

Figure 2:
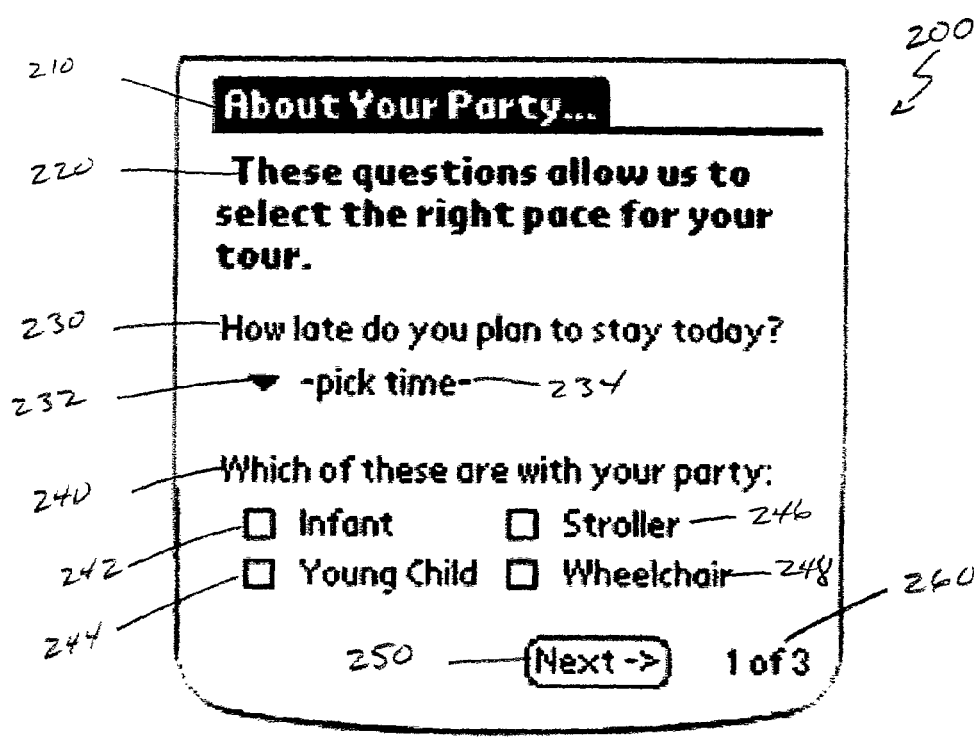
FIG. 2 is a detailed view of a query form, shown on the display screen, for gathering information about a party.

Referring to FIG. 2, shown is a query form 200 for the purpose of entering party information, step 714. In fact, query form 200 would be followed by additional query forms (not shown), each having a different set of questions, to collect additional information necessary to achieve the completion of step 714.

Query form 200 may provide a banner 210 and statement 220 to give context to the party using portable computer 100.

Length-of-stay question 230 inquires until what time the party plans to stay. Pick list handle 232 and prompt 234 provide a graphical user interface well known in the art for answering the length-of-stay question 230.

Figure 3:
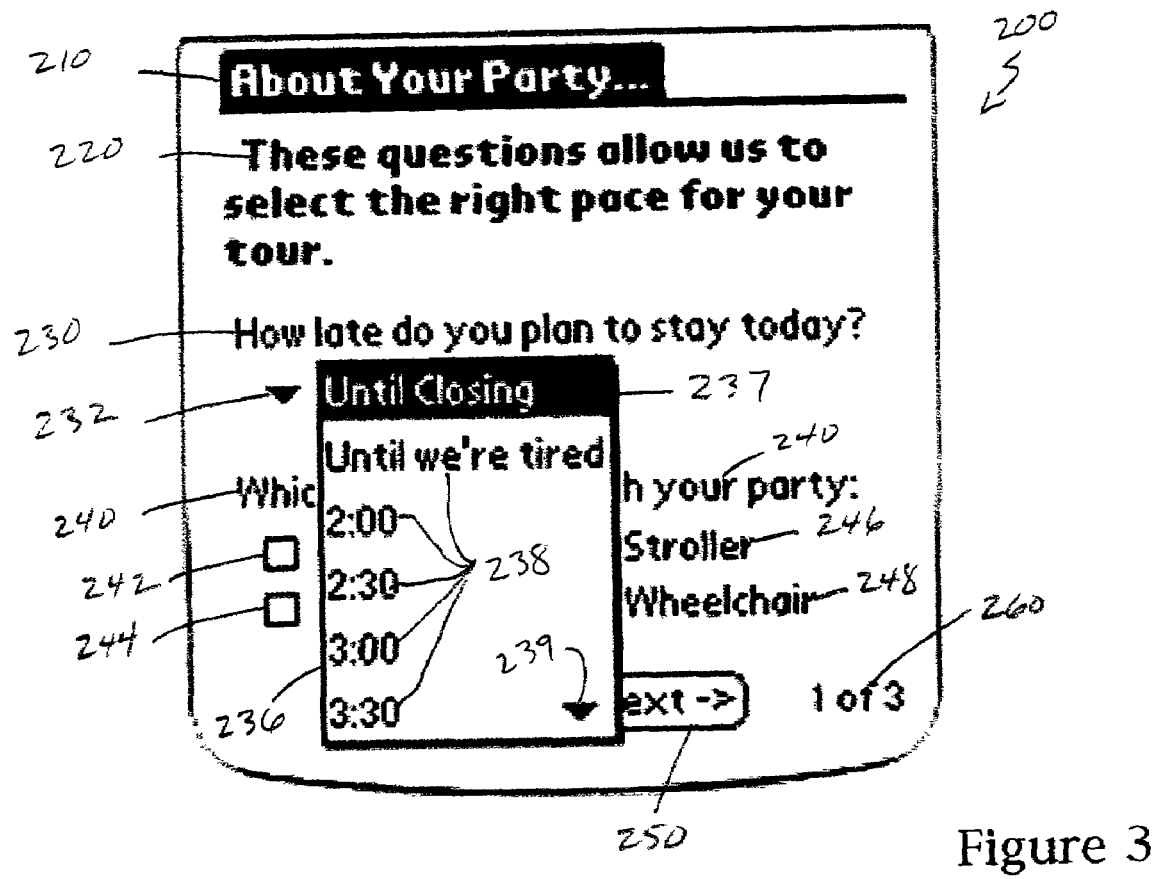
FIG. 3 is a detailed view of the same query form as FIG. 2, but in use.

Referring to FIG. 3, when pick list handle 232 or prompt 234 is touched, pick list window 236 appears. Pick list window 236 is comprised of at least one possible selection 238, and the current selection 237. If there are more possible selections 238 than fit within pick list window 236, a scroll indicator 239 may be shown. Touching the scroll indicator 239, or pressing a scroll button 150 or 152 will scroll the selections 237 and 238 in the pick list window 236. Touching a selection in the pick list window 236 makes the touched selection the current selection 237. When a current selection is established, prompt 234 becomes replaced with the text of the current selection. Data representative of the current selection, when made, is stored in memory in the party profile for later reference. This is consistent with the operation of pick lists familiar to those skilled in graphical user interfaces.

Party composition survey question 240 asks the party using portable computer 100 to indicate whether it contains any of the items listed. The party uses infant checkbox 242 to indicate that at least one infant is in the party. Similarly, the party can use young child checkbox 244, stroller checkbox 246, or wheelchair checkbox 248. Checkboxes 242, 244, 246, and 248 operate in the manner familiar to designers of graphical user interfaces: a touch on a checkbox will place a mark in the box, and that marked status will be recorded in the memory. A subsequent touch of the same checkbox will toggle it to the opposite state, checking or unchecking the checkbox depending on its state immediately prior to the touch. The corresponding datum in memory in the party profile is updated to match, and is kept for later reference.

Once answers to mandatory questions on this form have been received and recorded in memory in the party profile, next page button 250 allows the party to continue with the questionnaire. In subsequent query forms (not shown), a previous page button (not shown) may permit the party to review or revise their earlier answers. Once answers to all mandatory questions on all party information query forms have been answered by the party, a done button (not shown) appears and when pressed concludes step 714.

Figure 4:
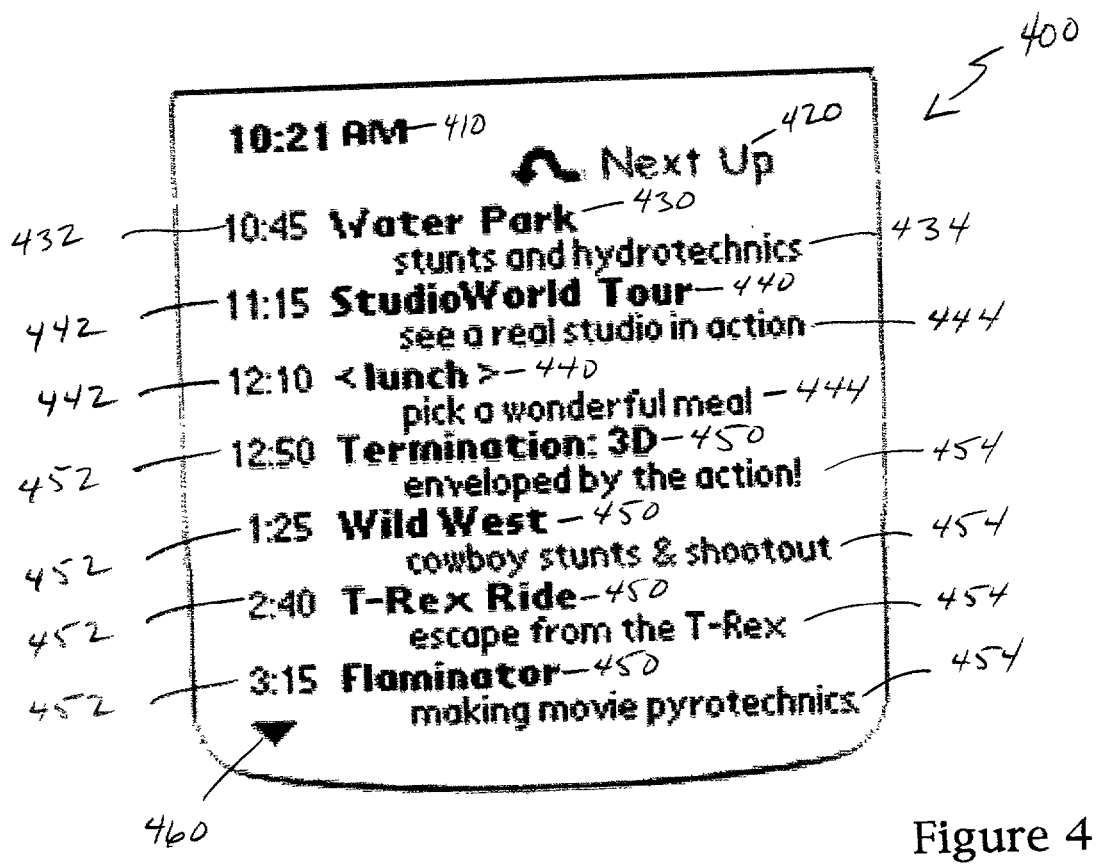
FIG. 4 depicts a schedule form, shown on the display screen, in accordance with the principles of the present invention, showing the next attractions in the itinerary for a party.

At any time after the itinerary generation results have been saved, i.e. step 718 is completed, pressing the itinerary button 154 calls up the itinerary form 400, shown in FIG. 4.

An event is a visit to an attraction at a facility that takes place at, or near, a specific time. An itinerary is composed of events. Depending upon the rules for constructing an itinerary, further discussed below, attractions may or may not be revisited over multiple events. It is generally preferable that attractions are not repeated.

The itinerary form preferably displays the current time 410. The current time 410 represents an authoritative clock so that parties do not miss events because of fast or slow running watches.

A current event banner 420 identifies the current event in the itinerary. The current event attraction name 430 is shown with a current event time 432. Preferably, a brief current event attraction description 434 accompanies the current event attraction name 430.

Near the current event attraction name 430, in chronological order, are the successive event attraction names 440, with their respective event times 442 and preferable event attraction descriptions 444.

Subsequently, and still in chronological order, appear the later event attraction names 450, their associated later event times 452, and later event attraction descriptions 454.

The attraction names 430, 440, and 450 and the event times 432, 442, and 452 are drawn from the itinerary recorded in step 718. The attraction descriptions are drawn from a data record containing information about each of the attractions of the facility.

Scroll marker 460 indicates that there are more event records to be viewed than can fit in form 400. Scrolling of the list of events can be achieved by touching scroll marker 460, or by operating the scroll down button 152 to achieve scrolling to display events in the indicated direction.

Figure 5:
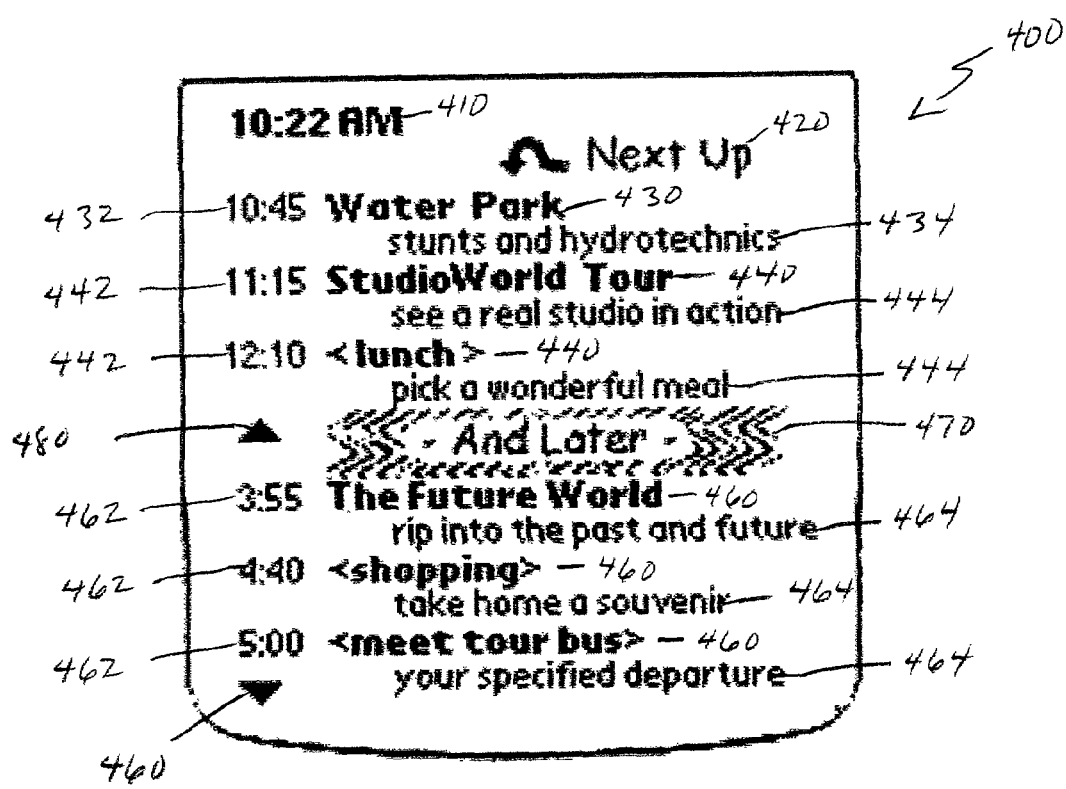
FIG. 5 depicts the same schedule form, with the last attractions of the itinerary scrolled into view.

FIG. 5 shows form 400 after some scrolling to show later events has taken place. Preferably, the current event information 430, 432, and 444 does not scroll. Optionally, successive event information 440, 442, and 444 also does not scroll. At the point where scrolling does begin, a break banner 470 is shown. Below the break banner, the much later event attraction names 460, much later event times 462, and much later event attraction descriptions 464 are shown. The much later event information 460, 462, and 464 appear in chronological order, though there are some events that occur between subsequent event information 440, 442 and 444 and the much later event information 460, 462, 464.

While the break banner 470 is shown and intermediate event data is not shown, scroll marker 480 is displayed. If there are no events later than those shown, scroll marker 460 should be hidden. Touching either display marker will scroll to display events in the indicated direction, and that same functionality is duplicated for buttons 150 and 152.

A party can optionally receive more information about each attraction by touching the attraction name 430, 440, 450, or 460.

Figure 6:
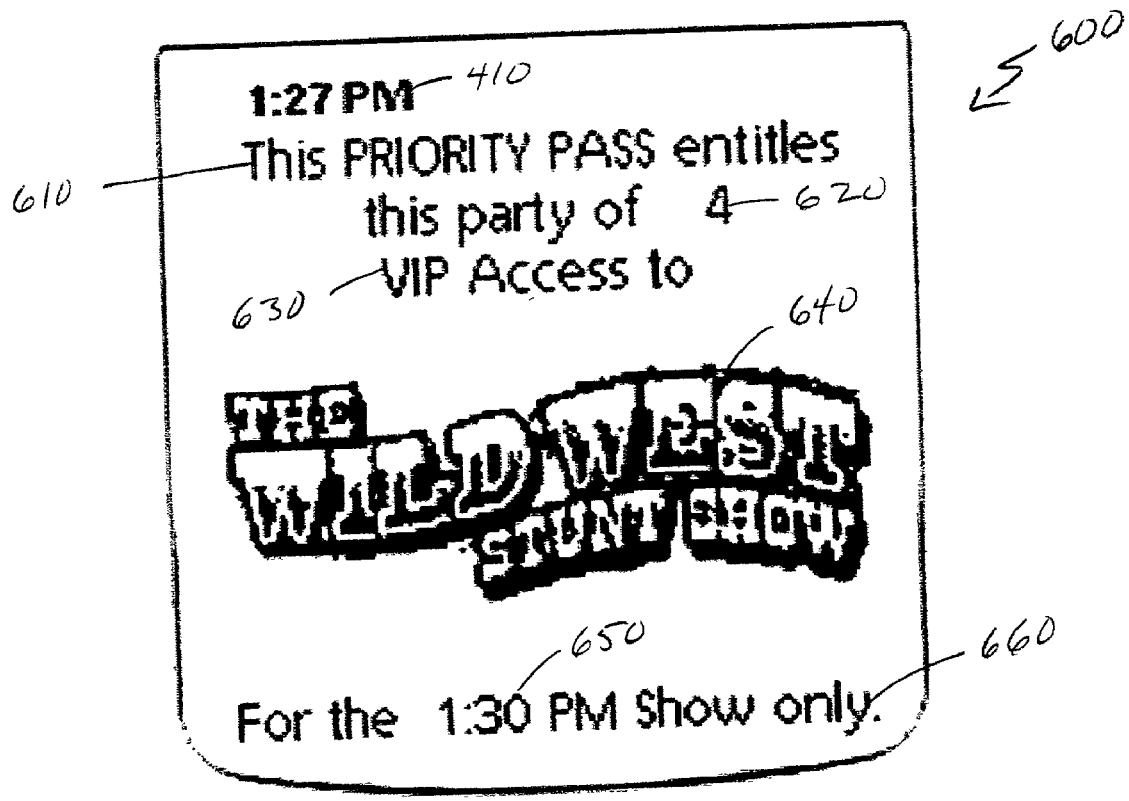
FIG. 6 illustrates a pass bearing form, shown on the display screen, to access an attraction produced in accordance with the principles of the present invention.

In the special case of current event attraction name 430, touching it may optionally bring up a pass form 600, showing a reservation or access permission. Such a pass is shown in FIG. 6. The exact nature of the pass will depend on the operation procedures instituted by the facility operators. However, information preferably provided on pass form 600 includes the items discussed below.

The pass form 600 should show the current time 410, so that an authoritative clock is provided to the party for the purpose of scheduling and for helping to manage any discrepancies with parties having fast or slow running watches.

The pass form 600 has a party size display 620. Also, there is a class of access display 630. Depending on the number of classes of access and the arrangements for handling different classes of access at an attraction, operational personnel may handled parties of different access classes differently. Typically, a party having a preferred access class would be accorded entry into a preferred, no-wait entrance, while a party having a regular access class would make use of the regular queue to access the attraction. Since the party size and access class is securely entered, this display can be relied upon by attraction personnel as representing authenticated admission media.

The pass must also indicate which attraction it is for, as with attraction name banner 640.

To complete the event information, the event time 650 slated is displayed, along with any limiting description 660. For example, the event time 650 might be "From 3:50 PM" and the limiting description 660 "until 4:30 PM". Generally, the limiting description was previously calculated and is stored as part of the itinerary in step 718. The limiting description 660 is designed to prevent the experience of the current attraction from overrunning the next consecutive event.

Optionally, a pass form 600 may contain an authentication code or signature (not shown). An attraction operator could use the code or signature to validate the pass. This would help to deter attempts to manufacture fraudulent passes to attractions.

A pass banner 610 identifies the pass form 600 to the party, so that they have context for the balance of the information on the form. Alternatively, pass name banner may provide some instruction to the party for how to use the pass. For instance, pass banner 610 might read, "Present this pass at the VIP gate to admit . . . " and the rest of pass form 600 is presented in a manner which completes the thought for the party ". . . a party of 4 to attraction X at time T."

Optionally, a pass form 600 may recognize a sequence of touch operations that an attraction operator may perform that will expend a displayed pass for the current event. An example of such a touch operation (not shown) would be drawing a large circle on touchscreen 140 clockwise, from the top, while pass form 600 is displayed. This might be followed by three taps in the center of the circle, and another large circle, but drawn counterclockwise from the top. Such a gesture, or other method for entering a security code, many of which are known to the art, would make a mark (not shown) to indicate that the displayed pass has been "spent". Usually this is not necessary, as experiencing an attraction often takes longer than the period for which a pass is valid. Further, upon exiting an attraction there will generally be another event in the itinerary and the party will not have time to reenter the attraction for a repeat experience.

It is appropriate now to consider how these functions might be implemented in other embodiments.

It is possible for secure information collection step 712 and party information collection step 714 to be performed by a facility employee.

In this alternative, the facility employee can enter the answers to the questions posed in the query forms 200 by asking that same information of the party and recording their results. For such a case, it is preferably that the party answers those questions in advance, perhaps while standing in queue to purchase facility admission. Their answers might be recorded on a paper survey form, which is then presented to the facility employee for entry into portable computer 100.

Those skilled in the art will recognize that whether the data are entered into portable computer 100 or some other device, that well-known mechanisms exist for portable computer 100 to access that information. It could be downloaded using a direct, wired connection, or it could be transferred wirelessly. A wireless transfer might occur at that time, or later. Also, in such a scenario, it is possible that the itinerary generation step 716 may be performed by another computer (not shown) and then only itinerary results generated would be transferred to portable computer 100 in step 718.

Another embodiment allows a party to purchase an admission, answer the party information queries, and generate an itinerary via the Internet, or other remote access system. In this case, the query forms would be presented to the user's remote terminal, for example a computer running a hypertext markup language (HTML) browser such as Internet Explorer by Microsoft Corporation (Redmond, Wash.), and interacting through hypertext transfer protocol (HTTP) to access a web site. It is well understood how one skilled in the art of web site design translates the forms presented here into HTML forms to query for and accept the same pieces of information. The responses to the queries are collected and recorded in a database operated for or by the facility. In manners well known, they are tied to the user and the transaction by database keys. Preferably, the user is provided with a transaction number. Alternative keys include the purchaser's credit card number used to make the purchase, the contact information of the user, etc. The transaction number, or alternate key, is subsequently used at the facility to retrieve the collected data, which can be inserted into his assigned portable computer 100 (before or after the itinerary has been generated) as described above. In addition, the itinerary generation may be run at the time of remote access and optionally presented to the user via the HTTP connection. Generally, however, it is preferable to delay itinerary generation until the day of the visit, so that the most current information about attraction availability can be utilized.

In another alternative embodiment, it is possible for all the steps of the process of generating an itinerary 700 to occur without ever using portable computer 100. Instead, the data collection steps 712 and 714, and the itinerary generations step 716, and the storage step 718 occur in or among other computers (not shown). Subsequently, the party is presented with a printed itinerary which details the same information that was available in itinerary forms 400. This alternative may be attractive for facilities which merely want to provide a personalized, self-guided tour, which has the property of distributing parties throughout the facility, rather than having them all follow a common route. This is attractive whether or not preferred access is conferred in conjunction with the itinerary.

Alternatively, the party may be supplied with a printed series of pass forms 600, making essentially a customized ticket book, having the same information printed on each paper pass as was displayed on the analogous electronic version (except time-of-day 410). If desired by facility operations, single person passes can be generated for each individual in a party, rather than one multi-person pass for the whole party. To deter fraud and perhaps enable mechanical devices known to the art to control access to the attraction, the authentication code or signature on pass form 600 (not shown) may be expressed in printed form as a barcode. This embodiment is particularly attractive if it closely resembles the attraction admission media already extant in a facility. When appropriate to the access control system, the event data related to the printed pass forms is inserted as records into the access control databases of the prior art such as Laval, et al. The authentication codes, on the printed pass forms expressed as printed barcodes, are also recorded. By so doing, the printed passes can function as if they were attraction admission media of the prior art, thereby allowing admission media of the present invention to function as, and in parallel with, admission media of the prior art.

In a similar embodiment, a party is issued an identification card or, if preferred by the facility operator, a card is issued to each individual in a party. In the same manner as above, event data is inserted as records into the database of the prior art such as Mahoney et al., and tied to the cards issued to the party. In this manner, the cards issued to the party operate as, and in parallel with, attraction access media of the prior art.

Figure 8:
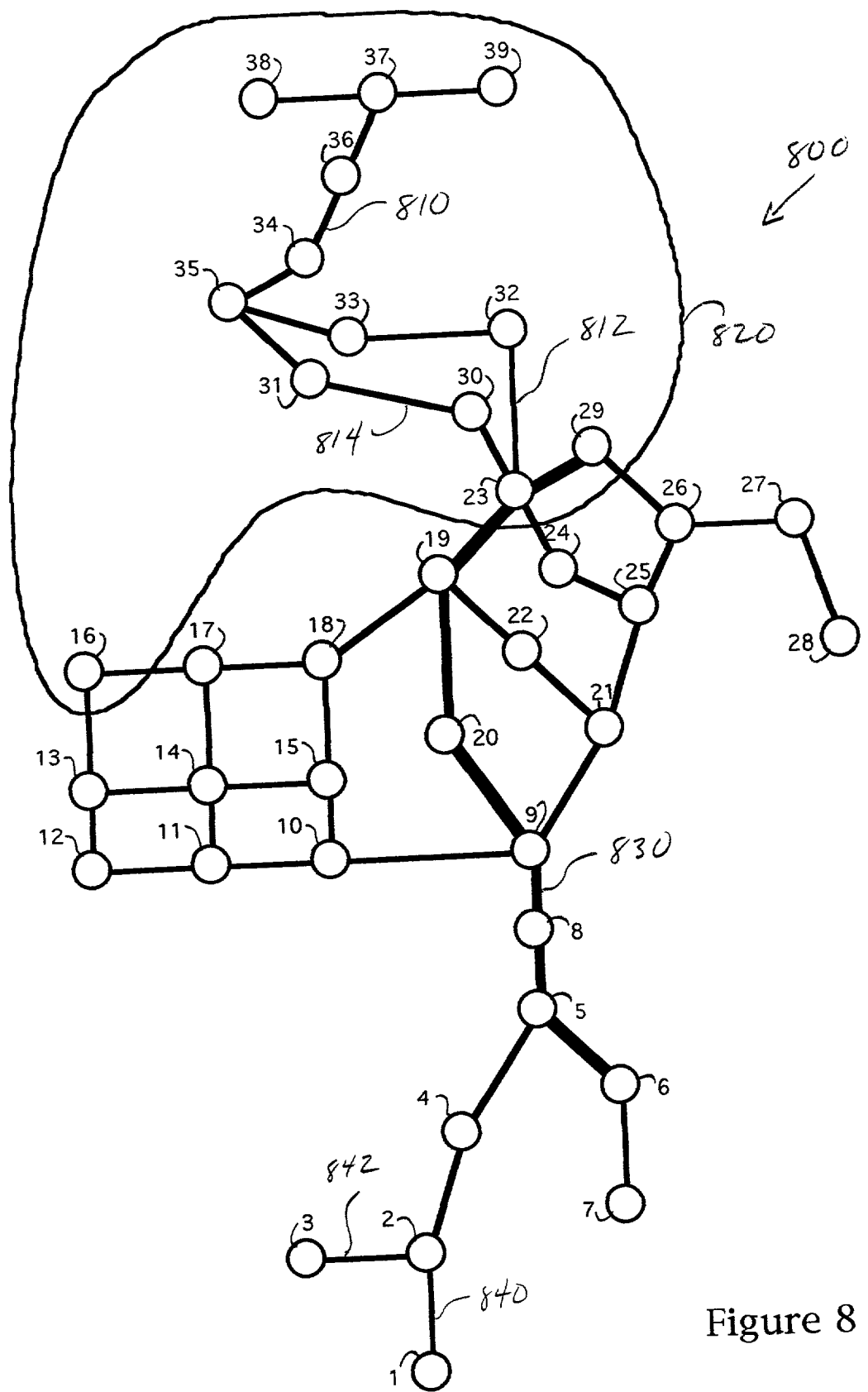
FIG. 8 is a map of an exemplary facility idealized as nodes and links suitable for designing routes.

FIG. 8 shows a map 800 of an exemplary facility. Locations within the facility are abstracted as nodes 1–39. Each node 1–39 represents a limited area, such as a plaza, intersection, landing, bend in a path, proximity to a marker, or other physical region. Nodes 1–39 are connected to others of nodes 1–39 by links, for instance, link 810 connects nodes 34 and 36. A node may not connect to itself.

FIG. 9 is a link database 900, a collection of information about the links in map 800. Each link is uniquely identified in a record of the link database 900 by the composite key of the start node field 910, and stop node field 912.

Data for each link includes the directionality field 920. Directionality field 920 indicates whether it is a one-way link (as with 920' corresponding to links 840 & 842 on the map 800). One-way directionality allows travel only from the start node 910 toward the stop node 912. If directionality field 920 indicates a two-way link (as with 920" corresponding to link 810), travel is allowed in either direction.

Preferably included in link database 900 is a barrier field 922. The barrier field 922 indicates, for instance, that a link is not suitable for travel by a wheelchair (as with 922' corresponding to link 812), perhaps representing a path requiring the use of stairs. It can also indicate that a link is suitable for use exclusively by wheelchairs (as with 922" corresponding to link 814), perhaps representing a path terminated by a wheelchair lift. Most paths are usually noted as having no barriers (as with 922''' corresponding to link 810).

The link database 900 also preferably contains information suitable for determining a party's transit time on the link. The information is most representative if empirically obtained, that is by statistical measurement of party travel times. Preferably this information is captured for at least two types of parties: those who move quickly, whose travel times per link are recorded in fast group field 930, and those who move slowly, recorded in slow group field 932. Depending on a party's attributes, they may be categorized as a fast group or a slow group, and data from the appropriate field (930 or 932 respectively) would be selected for itinerary generation step 716. Travel time data is preferably given in seconds.

Alternatively, travel time data may include time or facility attendance dependencies. For instance, if travel time is known to increase dramatically in temporal proximity to a large theater show end time, then the link database could be augmented to represent such data. Similarly, if values vary with facility attendance, then travel time fields 930 and 932 could be further characterized on light and heavy days.

Alternatively, categorization of fast or slow group and light and heavy attendance expected can be computed on a continuum, rather than as discrete determinations. In this case, values from the link database for travel times can be interpolated to determine a more accurate value when generating an itinerary.

Alternative representations of travel time data is possible. Link database 900 could also include fields for a link's physical length, steepest grade, narrowest point, net change in altitude, roughest terrain, etc. Such information may be appropriate when implementing for larger, outdoor facilities such as national parks or historic battlegrounds, etc. Estimation algorithms, used for planning hikes, would be used to interpret such information into times for the party during itinerary generation step 716. In larger facilities, travel times might be expressed in minutes or hours.

FIG. 10 illustrates an exemplary attraction database 1000. The attraction database 1000 contains a field for the name 1010 of each attraction, a field for a brief description 1012 of each attraction. The attraction names 1010 and attraction descriptions 1012 are used to populate names 430, 440, 450, 460, and descriptions 434, 444, 454, 464 on itinerary forms 400, respectively.

To provide attraction data needed in itinerary generation step 716, attraction database 1000 includes scheduling factors 1020. For each attraction, there is an entry node field 1021 which indicates from which node in map 800 the attraction queue is approached. Similarly, for each attraction there is an exit node field 1022 to indicate where on map 800 a party is located when an attraction exits. Often, exit node field 1022 contains the value "same", rather than a node indicia, to identify the special condition of an attraction that returns a party to the same node where the attraction was entered.

Often, attractions are rides or theater shows, which do have discrete entrances and exits. Sometimes, however, the location of an attraction is not so well bounded.

In the case of a parade, the location of the attraction is the parade route. In exemplary facility map 800, there is a parade route beginning at node 29 and proceeding in sequence to nodes 23, 19, 20, 9, 8, 5, and ending at node 6. The links along this route are drawn in FIG. 8 with a heavier line, such as the one used in link 830. In attraction database 1000, the entry node field 1021 for a parade attraction contains a reference 1021' to a "list A". List A is contained in distributed location database 1100, shown in FIG. 11. Distributed location database 1100 contains for each node along the parade route the node indicia field 1110, and a start time delay field 1120. The start time delay field 1120 indicates how long in seconds after the showtime for the parade event the show begins at the listed node. This is because a parade nominally starting a time may actually not arrive at a specific node until many minutes (or hours, if we're talking about the Rose Bowl Parade!) later. Thus, itinerary generating step 716 preferably eliminates wasted time for the party by scheduling them to get to a parade viewing location at a time appropriate to when the parade will be arriving at that viewing location.

Another case where the location is not confined to a single node is a fireworks show. At the exemplary facility captured in map 800, experts have determined that the area bounded by loop 820 is suitable for viewing the fireworks attraction. In the attraction database, the entry node field 1021' notes that "list B" contains the nodes from which the attraction may be experienced. In distributed location database 1100', the node indicia field 1110' lists those nodes found within the loop 820. Because of the nature of this attraction, there is effectively no delay in start time between the nodes, so entries in the start time delay field 1120' are all zero.

Note that the exit node fields 1022 for the two multi-node lists 1021' and 1021" are both "same". A party experiencing an attraction at a node n in distributed location database 1100 indicia field 1110, will exit that attraction at the same node n (i.e. when you start watching a parade, you don't move, the parade does. You end up where you started!).

In rare cases, an attraction may have multiple exits and the exit used by a party cannot be anticipated. In such a case, itinerary generation step 716, when including the multi-exited attraction in an itinerary, must compute the travel times to the next event from each of the possible exits and choose the least favorable.

For each attraction, attraction database 1000 includes a theoretical hourly ride capacity (THRC) or other measure to indicate the capacity of an attraction to handle visitors. Such measures are well known in the art, and are commonly expressed as the number of seats in a ride vehicle times 3600 divided by the dispatch interval in seconds. For theaters or venues with specific, scheduled times when the attraction begins (like a parade or fireworks show), the holding capacity of the attraction venue may be used. For such attractions, a showtimes field 1024 indicates how many shows are given during the day. This information is used to allocate demand evenly when creating itineraries. In another database (not shown), the actual start times for scheduled attractions are listed. For those attractions which are continuously running and which are not scheduled, the showtimes field 1024 contains "c", for continuously running. A zero would indicate that an attraction of either type is not available today.

For attractions having scheduled shows, the specific show times are stored in a separate list (not shown).

In addition to the showtimes field 1024, the duration field 1025, and queue field 1026 contain the length of the attraction and the length of the queue, respectively, preferably in seconds.

Alternatively, itinerary generation may be performed for parties with different classes of access. Also, a party may have one class of access for some attractions and another class of access for other attractions. In these cases, multiple queue fields 1026 will be necessary, to account for different queue delays by access class. Such would be the case for an attraction having a premium access queue allowing a party with the correct access class to use the express queue to reach the attraction.

Also, if queue delays are known to vary by hour or by facility attendance, these complexities can also be included. Rather than finding a simple number of seconds delay in queue field 1026, itinerary generation may access a function for the expected queue delay. Such a function may take as parameters the attraction, access class, the day's expected attendance, and time-of-day. Since the queue being examined is determined by the attraction and access class, the actual analysis is essentially reduced to the two-variable "attendance and time-of-day produce what queue delay" problem. A function such as this could be built by selecting an appropriate surface to be fitted to empirical data gathered from the attraction. Operators of most facilities have such historical operational data readily available. Further, such a function could access actual, current queue information as it becomes available and whenever an itinerary is revised.

From the attraction data stored in the scheduling factors 1020, enough information is available for itinerary generation step 716 to account for time to get to the attraction, wait time in queue, duration actually experiencing the attraction, and the time to get to the next event.

Optionally, some attractions may have scheduled opening or closing times which differ from the overall facility operating hours. In such a case, an open time field (not shown) and close time field (not shown) must be included so that events are not put into the itinerary for attractions that are scheduled to be closed.

In order to select attractions for a party to experience that will please the party, attractions can have an assortment of acceptance factors 1030 recorded in the attraction database 1000.

Examples of attraction acceptance factors 1030 are shown in fields of attraction database 1000. The examples include "violence" (whether an attraction depicts violent behavior, such as a gunfight) in field 1031; "loud" (whether an attraction has an abundance of loud noises, like explosions) in field 1032; "get wet" (whether an attraction essentially assures that riders will be soaked, no exceptions) in field 1033; "kid entertainment" (appropriate to an attraction which is directed exclusively toward children) in field 1034; "height limited" (for attractions which have minimum height requirements for correct operation of safety equipment) in field 1035; "wheelchair transfer required" (for rides which do not accommodate wheelchairs, but can accommodate a visitor who transfers from a wheelchair) in field 1036; and "bores kids" (for exhibits which will not be enjoyed by children) in field 1037.

The choice of acceptance factors 1030 incorporated into attraction database 1000 is either pontificated by an informed expert (such as facility operations personnel or an attraction designer), or gathered empirically by correlating answers given by visitors in surveys which ask a variety of questions and solicit the visitors' reactions to the attractions. The empirical method usually provides results with less unintentional bias.

When acceptance factors 1030 are being selected for inclusion in attraction database 1000, the goal is to select factors which best distinguish between groups of attractions having the highest mutual orthogonality. The two acceptance factors "get wet" (described above, and shown in field 1033) and "feel cold" (whether an attraction makes you feel cold afterwards, not shown) are unlikely companions in the selection of acceptance factors, because they probably would be shared by the same subset of attractions: their mutual orthogonality is likely zero. The "bores kids" field 1037 is a reasonable selection for the exemplary attraction database 1000, as it differentiates two attractions from all others.

Offsetting the goal of high mutual orthogonality is a desire to maximize the number of attractions influenced by an acceptance factor. The "Kid entertainment" field 1034 is a more valuable acceptance factor than "bores kids" field 1037, because it influences the acceptability of five attractions, rather than only two.

In determining highest mutual orthogonality, complementary orthogonality should also be considered. "Bores kids" field 1037 is similar, though not quite identical, to the complement of the conjunction of the "loud" and "kid entertainment" fields 1032 and 1034. Thus, "Bores kids" may be a weaker acceptance factor.

Some acceptance factors deal with matters sufficiently critical that they are included regardless of orthogonality or attraction number. For instance, "wheelchair transfer required" field 1036, though containing data for exemplary facility attractions significantly similar to those of "height limit" field 1035, makes a significant difference to itineraries generated for an affected visitor (i.e. for one who is unable to transfer from a wheelchair).

In steps 712 and 714, information about the party is gathered which has an influence on their favor of, or aversion to, attraction factors. There is also a contribution of this information to the categorization of the party's speed.

The data stored in the party profile from steps 712 & 714 are interpreted to categorize the party and determine its response to attraction acceptance factors 1030. The data gathered in steps 712 and 714 are chosen to have a strong influence on the selected acceptance factors. For instance, if the "kid entertainment" field 1034 is included as an acceptance factor, knowing whether a party contains small children is important. Conversely, whether the party has any blond members is not useful for inclusion in the profile, based on the exemplary acceptance factors 1030.

In FIG. 12, profile interpretation database 1200 shows the relationship between profile data elements 1210, link attributes 1220 & 1230, and attraction acceptance factors 1240.

For clarity of explanation, profile elements 1210, link attributes 1220 & 1230, and attraction acceptance factors 1240 are presented herein as if they were binary all-or-nothing values. It is to be understood, and will be appreciated by those skilled in the art, that the principles of fuzzy logic or weighted metrics could easily be applied here to achieve more linear, scalar result.

Further, the implementation of this operation in the form of a database having records is for convenience of explanation. It is acceptable for the relationships of profile interpretation database 1200 to be implemented a hard coded decision making routine. However, the complexities of an explanation accompanying such arbitrary code make this presentation preferable. It will be appreciated by those skilled in the art, that the general form of useful relationships between profile elements 1210 and the other fields of profile interpretation database 1200 may exceed the expressive capability of this representation. Such relationships, however, are well within the reach of those skilled in the art when using arbitrary coding techniques.

There is a relationship between "barrier" field 1230 of profile interpretation database 1200 and "barrier" field 922 of link database 900. As noted in profile element record 1215 having field value 1230', parties having a wheelchair noted in their profile are prohibited from being routed via links having a "no wheelchair" value. Parties NOT having a wheelchair noted in their profile are prohibited from being routed via links having a "wheelchair only" value.

There is a relationship between "slow group" field 1220 of profile interpretation database 1200 and the travel time data of "fast group" field 930 and "slow group" field 932. If a party profile contains a profile element corresponding to a record in profile interpretation database 1200 which has a mark in "slow group" field 1220, then the party is categorized as a "slow group" for purposes of employing link attribute field 932 when calculating travel times along links in itinerary generation step 716. Otherwise, the party is categorized as a "fast group", and the "fast group" field 930 is employed when calculating travel times along links.

For example, in profile interpretation database 1200, the "large group" profile element record 1211 notes by the value of the "slow group" field 1220' that a party having in its profile a notation that the party size is in excess of five, will be categorized as a "slow group". Similarly, the "have small children" profile element record 1212 notes by the value of its small group field 1220', that a party with a notation in its profile that the party has small children will also be categorized as a "slow group", with like effect.

There is a direct relationship between acceptance factor fields 1240 of profile interpretation database 1200 and the acceptance factor fields 1030 of attraction database 1000. The correspondence is between fields 1241–1247 and 1031–1037 respectively.

For example, the "have small children" profile element record 1212 (in addition to the "slow group" categorization above), by the positive reaction mark 1244' in "kid entertainment" field 1244, indicates that such a party will have a positive response to attractions having a mark in the "kid entertainment" field 1034 in attraction database 1000. When constructing a utility function (discussed below), an positive reaction mark will cause the resulting value of the utility function to increase.

Similarly, according to record 1217 for profile element "phobia: loud", parties having an aversion to loud noises will, by virtue of the aversion mark 1242' in "loud" field 1242 will have a negative response to attractions having marks in the corresponding "loud" field 1032 of attraction database 1000. When constructing a utility function (discussed below), an aversion mark will cause the resulting value of the utility function to decrease.

A more complex relationship is represented by nullification mark 1245' in record 1214 which indicates that any party having an aversion to attractions having a mark in "height limit" field 1035 as indicated by data in the party's profile corresponding to a record having an aversion mark in the "height limit" field 1245, will be nullified by a party indicating that they are prepared to perform a baby swap in order to attend an attraction. Plainly, if a party would normally be adverse to experiencing an attraction because it was unsafe for their infant, but they are willing to take turns caring for the infant with the balance of the party rides, then that willingness overcomes the aversion. (Note however, that the itinerary generating step must consider that the expected queue time and duration of the attraction will be increase by the execution of the baby-swap maneuver. The specific change of times will be dependent on the operational procedures employed by the facility operator for each attraction.) When constructing a utility function (discussed below), a nullification mark will cancel the effect of any positive response or aversion marks found for the factor.

The aversion mark 1246' in record 1215 indicates an aversion exists for parties with profile element "wheelchair" and attractions having a "wheelchair transfer required", indicated by a mark in field 1036. The nullification mark 1246" indicates that the aversion due to a mark in field 1036 is moot if the party has recorded in its profile that a wheelchair transfer is possible.

The creation of profile interpretation database 1200 requires the application of some logic, and ultimately drives the shape of the party profile and the questions posed in information gathering steps 712 & 714. The trivial solution is to ask questions like "is your group slow moving" to determine whether a group is to be categorized as a "slow group" or a "fast group". The result would be a square database corresponding to a party profile in which each profile element record 1210 would correspond to exactly one field 1220, 1230, or 1240. However, such a set of questions may appear stilted and duplicative.

The party profile can feasibly contain any data about the party or its admission privileges, which would help to make an itinerary result in a more enjoyable visit for the party. This may include a "favorite attraction" selection, or a "would you wait in a long line for extraordinary attraction X if an express access is not available" query. The modifications to computations made in itinerary generation step 716 may require some contemplation, but should become apparent to a skilled practitioner.

In facility where instantaneous demand for access to a particular attraction exceeds the attraction's instantaneous capacity, the queue grows. If sustained demand exceeds sustained capacity, then the queue growth continues. Eventually, the queue becomes so long as to become daunting to some visitors otherwise interested in the attraction. The increasing aversion to longer queues eventually balances the constant allure of the attraction, and queue length stops growing.

In a facility having a preferred class of visitors, the operators may allocate a fraction of an attraction's capacity to an avenue of preferred access, open only to visitors of the preferred class (as described in both Laval et al. and Mahoney et al.) The demand across all holders of preferred access rights may exceed the allocated of capacity by some factor X. In such a situation, it is desirable to moderate the demand by at least the factor 1/X, so that the allocated capacity is not exceeded. It is to be understood that the allocated capacity may be a hard limit, as in the case of an attraction whose actual physical capacity is entirely dedicated to the preferred class of visitors, or it may be a soft limit, as in the case of an attraction whose physical capacity is 10% dedicated to preferred access and the remaining 90% to regular queued access.

One way of ensuring that the allocated capacity of an attraction is not exceeded by itineraries generated which include that attraction is to centrally manage itinerary generation. As the attraction capacity allocated to a visitor class during an interval is approached, a synthetic aversion factor is increased which lowers the desirability of inserting an event into an itinerary having a time in that interval for that attraction. When the capacity for an attraction during a particular interval has been reached, the synthetic aversion factor is such that the attraction is utterly undesirable.

In the preferred embodiment, no central database is employed. Instead, from a list of attractions expected to have demand beyond allocated capacity, a random selection process determines which attractions will be given a synthetic aversion factor. The aversion factor will be scaled according to the degree by which excessive demand is expected. This will be most appropriate to attractions where the capacity allocation is soft, since any statistical fluctuation in demand over many generated itineraries will be absorbed by the regular queue.

In the case of a hard capacity allocation, the aversion factor will be increased adequately to limit the likelihood of a universe of itineraries in which the hard capacity allocation is overrun for an extended period. This reduces the likelihood that the hard capacity limit produces a large queue.

In addition, the random seed can be used to influence distribution of attraction usage by influencing and homogenizing the first attraction to be visited. Unlike the traditional "self-guided tour" pamphlet that directs all visitors first to station one, and then to station two, use of the random seed can influence the initial attraction selection for the itinerary. This influence is incremental to the diffusing influence that the variations in party profiles will have. However, if there are certain modes in which party profiles seem to gather, then a randomizing diffusion is desirable.

A suitable diffusion function may be based on a random number function called rand( ), which accepts a seed value S, and returns a value in a range between 0 and 1. For duplicated values of the seed S, the returned value is consistent. If no seed is passed, a pseudorandom sequence of values is returned for consecutive calls of the function. Slight changes to the seed produce unpredictable changes to the returned value, and place the random number generator at a different place in the very long sequence of pseudorandom numbers. The returned values are evenly distributed within the range. Such functions are commonly provided in computer language libraries, and are well known.

The scale of the perturbation provided by the diffusion function is controlled by a parameter F, the fuzziness. The overall perturbation P is given by EQUATION 1. The perturbation P has a probable value which is evenly distributed in the open range of (−F, +F).

$$P=\mathrm{rand}(\ )*(2*F)-F \qquad \text{EQUATION 1}$$

FIG. 13 shows an example use of the perturbation function. Table 1300 shows the results of a hypothetical calculation to determine the desirability of each of three attractions AA, BB, & CC, for each of two party profiles A & B. An attraction with a higher desirability value is more alluring to a party than an attraction with a lower desirability value. Therefore, the most desirable attraction for a party is the attraction with the maximum desirability value. For these tables, the fuzziness parameter 1310 is set to 1.0.

Without the diffusion provided by the perturbation function, any evaluation to determine the most desirable attractions under a specific party profile will yield the same result.

In table 1320, profile A is used to evaluate the desirability of attractions. The unperturbed column 1321 shows that in one hundred samples, all one hundred evaluations of the examinations found that attraction CC, with its desirability of 8.0 under profile A (as seen at 1301 in table 1300) is always the maximum of the three attractions' desirabilities. However, when perturbation function is called for each of the three attractions and added to their respective desirabilities under profile A and this process is repeated one hundred times (simulating an evaluation run for each of one hundred parties having profile A), then the evaluation of the maximum attraction desirability does not always result in selecting attraction CC. Column 1322 of table 1320 shows that in one run, for twenty-one of one hundred parties, attraction BB was selected as most desirable, and for the remaining seventy-nine attractions, attraction CC was considered most desirable.

In table 1330, profile B is used to evaluate the desirability of attractions. Column 1332 shows the results after one hundred evaluations of profile B using the perturbation function with fuzziness F of 1.0. In this particular run, twenty-four parties determined that attraction AA was the most desirable, and the remaining seventy-six determined that attraction CC was the most desirable.

In table 1340, the results of the two-hundred evaluations are combined. Before application of the perturbation function, the demand placed on the most desirable attraction was driving all two-hundred parties to attraction CC, as shown in column 1341. With the fuzziness parameter F set to 1.0, the perturbed results show that almost ¼ of the demand on attraction CC has been distributed to the other attractions.

The results shown in tables 1320, 1330, and 1340 would vary somewhat in different runs of the perturbed evaluation, as the random number generator would produce different results. If more demand has been shifted than is necessary, the fuzziness F can be reduced. If it is necessary for even more of the demand on attraction CC to be distributed to other attractions, the fuzziness F can be increased. In the limit, for large F, demand will be distributed, on average, evenly across all attractions, which is generally an undesirable outcome, as the party's profile has ceased to contribute to the selection of what attractions will be included in their itinerary.

A perturbation function may be selected to only downgrade the desirability of an attraction. In such a case, shown in EQUATION 2, the result of the perturbation function will be in the open range (−F, 0). In practice, each attraction having excessive demand can have a fuzziness value which statistically degrades that attraction's desirability in evaluations under a party's profile.

$$P = \text{rand}(\ )(B*F) \quad \text{EQUATION 2}$$

It will be recognized that other functions, perhaps driven by usage data, attraction capacity, or other accumulated information can be constructed and used to diffuse or moderate demand.

Figure 14:
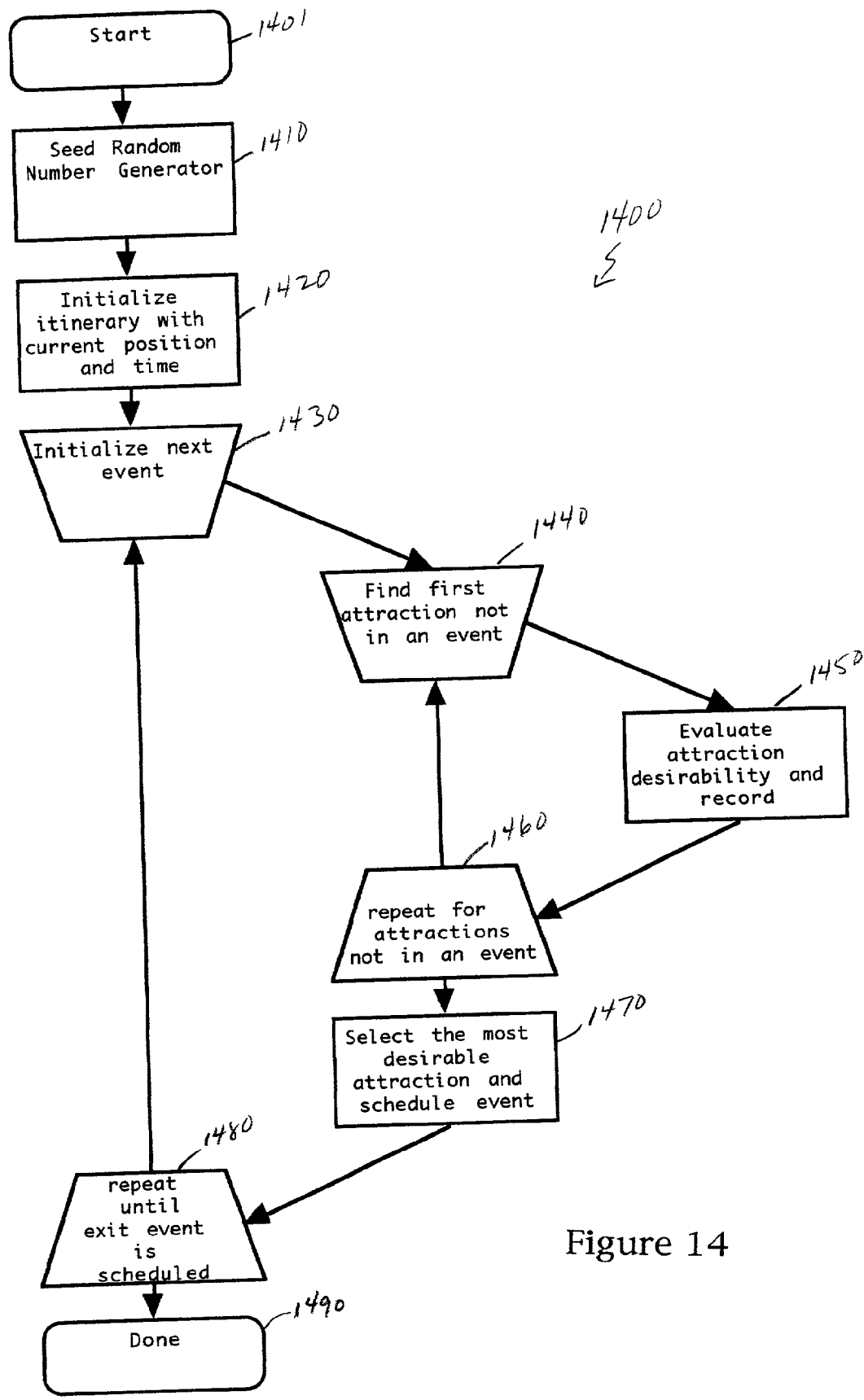
FIG. 14 illustrates a flowchart describing in detail an exemplary method for generating an itinerary and, FIG. 15 depicts an itinerary database composed of individual event records.

Referring to FIG. 14, the preferred method 1400 for generating an itinerary for a party is shown. Itinerary generating method 1400 is suitable for performing the itinerary generating step 716.

In the starting step 1401, access is provided to the party profile gathered in steps 712 & 714, node database 800, link database 900, attraction database 1000, and profile interpretation database 1200, if these are not already available.

In step 1410, a seed unique to the portable computer 100, or unique to the party in the case of another embodiment, is acquired. If portable computer 100 is present, its CPU may have an accessible serial number which may be used to derive a unique seed, otherwise a unique username may be used. If itinerary generation process 1400 is being performed on a shared or central computer, then the party profile will preferably be kept in a record having a key which can be used to derive a unique seed. Otherwise, some unique data element of the party profile (for instance, an admission purchase transaction number), may be used. Once obtained, the unique seed is used to initialize the pseudorandom number generating function rand( ) used in step 1450, discussed previously.

It may be noted here that any execution of the following steps, utilizing an identical party profile and contents of databases, will produce identical results if the seed value is the same. This property can be used to synchronize the itineraries of a group that wishes to operate as multiple parties.

Figure 15:
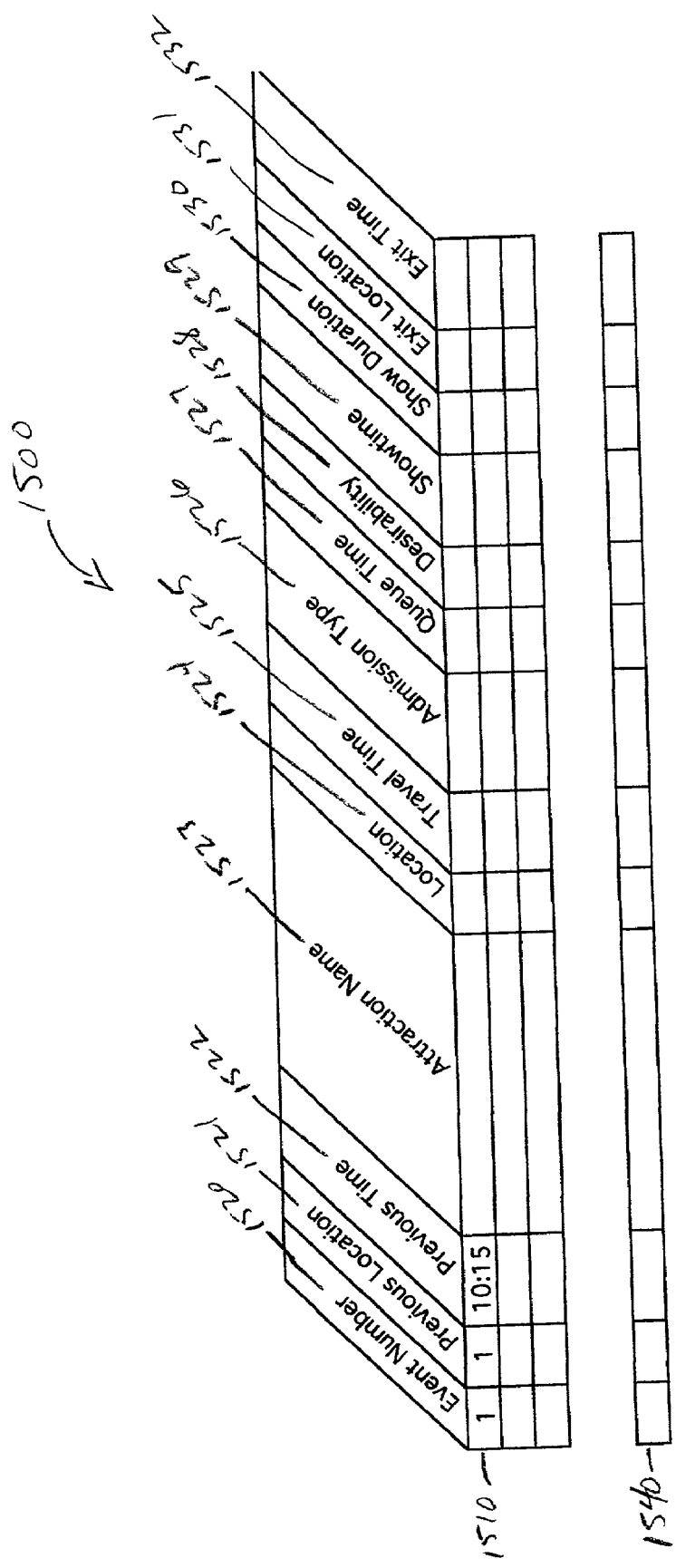

An itinerary database 1500, shown in FIG. 15, is prepared for use in step 1420. Each row in itinerary database 1500 represents an event. Initially, the itinerary contains no events, and the rows are empty. The first event 1510, is numbered 1 in event number field 1520, the previous location field 1521 is set to the exit node field 1022 for the attraction named "Entrance". If the field 1022 contents is "same", then the value is taken as the value in entry node 1021. The previous time 1522 is taken as the current time, from the executing processor's authoritative time-of-day clock. This value is also copied to temporary event 1540. However, if a known delay will occur before the itinerary is to be used, or the itinerary is to begin at a specific time, then that time will be used instead of the time-of-day clock.

Other than for first event 1510, the next empty event record is initialized in step 1430. This is achieved by incrementing the value of the previous event number 1520 and inserting into the new current event record in the same field 1520, and temporary event record 1540. The value from the exit location field 1531 of the previous record is copied into the previous location field 1521 of the new current event record, and temporary event record 1540. The value from the exit time field 1532 of the previous record is copied into the previous time field 1522 of the new current record and temporary event record 1540. A value of zero is entered into desirability field 1528 of the new current record.

In step 1440, the attraction database 1000 is scanned for the next attraction that does not appear in the attraction name field 1523 of any event in itinerary 1500.

In step 1450, the attraction from step 1440 is evaluated.

If this is the first time that this attraction is being evaluated for this party, the desirability perturbation is calculated and recorded, preferably using EQUATION 2 and an attraction specific fuzziness (not shown) from attraction database 1000. The attraction specific fuzziness should be empirically set to mitigate excess demand, if any, for the attraction. If there is no excess demand for an attraction, the fuzziness for that attraction may be zero. In subsequent executions of step 1450 involving this same attraction and same party, the recorded desirability perturbation is reused, not recalculated. Thus, the rand( ) function will be called only once per attraction per party. This gives each party, having a unique seed value, a different random perturbation for the current attraction, and the perturbation obeys the empirically set behaviors to mitigate excess demand.

Alternatively, the perturbation may be calculated using EQUATION 1, which will have its own empirically determined fuzziness by attraction, which will serve to break up the 'clumping' of parties with like or similar profiles generating itineraries beginning at similar times. Further, the effects of the EQUATION 1 diffusion and the EQUATION 2 demand mitigation can be mixed.

The attraction is copied into attraction name field 1523 of temporary event record 1540.

From attraction database 900, the value of the entry node field 1021 is obtained for the present attraction and entered into the location field 1524 of the temporary event 1540.

If the node field 1021 contains a reference to a multi-node list in distributed location database 1100, then each node listed for the current attraction in distributed location database 1100 is compared against the node stored in previous location field 1521 of the temporary event 1540. The node that is found to have the shortest travel time (the nature of this calculation being described below) is recorded in the location field 1524 of the temporary event 1540. In essence, the party will be directed to the nearest location suitable for experiencing an attraction having a distributed location.

From the link database the path having the shortest travel time from the node in the previous location field 1521 of temporary event 1540 and the node in the location field 1524 of temporary event 1540 is calculated. In calculating the path having the shortest travel time, only links in link database 900 having barrier field 922 appropriate to the party's profile are used (i.e. wheelchairs will not be considered to travel routes having stairs). Further, the travel times used to calculate the path travel time will be selected from the "fast group" field 930 or "slow group" field 932 depending on which group the party's profile (suitably interpreted as previously described with profile interpretation database 1200) indicates. Once calculated, the shortest travel time is recorded in travel time field 1525 of temporary event 1540.

If the previous time 1522 plus the travel time 1525, both of temporary event 1540, exceeds the facility operating hours, then the step 1450 is terminated immediately, because there is not adequate time to get to the current attraction before the facility closes. Alternatively, if an attraction has an opening and/or closing time (not shown) listed in attraction database 1000, this sum can be compared to see if it falls within a period where the attraction is open. If not, the step 1450 is terminated immediately because the attraction is closed at this time.

The party profile is examined to determine the admission class of the party for the current attraction. Once determined, the admission class is recorded in the admission type field 1526 of the temporary event 1540. Admission class will generally be a constant for a particular party regardless of the attraction. However, it can differ by attraction when, for instance, a party has purchased a special upgrade admission for a particular attraction. Alternatively, it can differ when the facility operating procedures downgrade the attraction admission class after the first admission to the attraction (i.e., a party's first visit to attraction X may be accorded the premium access to the express entrance, while subsequent visits by the party to attraction X may be downgraded to regular access.)

Queue time for the current attraction is gathered from field 1026 of attraction database 1000, and placed in queue time field 1527 of the temporary event 1540. If the queue time of the attraction depends on admission class, then the correct queue time is retrieved for the admission class in field 1526 of temporary event 1540. If appropriate, start time delay field 1120 is added to this value.

The showtime for the current attraction is retrieved from showtimes field 1024 in attraction database 1000. If the retrieved value is "c", representing a continuously cycling attraction, then the value recorded in the showtime field 1529 of temporary event 1540 is the sum of the previous time field 1522, travel time field 1525, and queue time field 1527, all of temporary event record 1540.

If the retrieved value is zero, the step 1450 is immediately terminated because this attraction is not operating today.

If the retrieved value is a numeric value other than zero, then the sum of the times is calculated as just described and the show time list (not shown) is searched for the next showtime for the current attraction that occurs after the time calculated. If no such show time is found, the step 1450 is immediately terminated because this attraction has no additional shows this day. Otherwise, the earliest showtime found is entered into the showtime field 1529 of the temporary event record 1540.

The value in the duration field 1025 for the current attraction from attraction database 1000 is copied into show duration field 1530 of temporary event record 1540.

The values of showtime field 1529 and show duration field 1530, both of temporary event record 1540 are summed and recorded in exit time field 1532 of the same record.

If the value recorded in exit time field 1532 is later than the departure time recorded in the party profile, then step 1450 is immediately terminated because the current attraction takes the itinerary past the scheduled departure time. Further, if the exit time plus a travel time computed for the party from the exit location 1531 of the temporary event 1540 to the entry node 1021 listed for the "Exit" record in attraction database 1000 exceeds the scheduled departure time, then too will the step 1450 immediately terminate, as the present attraction ends too late to get to the facility exit by the scheduled time.

Desirability field 1528 is computed for the temporary event 1540. The computation is a utility function which takes into account the following factors: the party profile, interpreted with the profile interpretation database 1200, and read against the current attraction's acceptance factors 1030 from attraction database 1000; the previously calculated perturbation for this party and this attraction; the difference between the showtime 1529 and the sum of the previous time field 1522, travel time field 1525, and queue time 1527 (i.e. a measure of how much earlier than necessary this event is placing a party into queue for a scheduled show); and the availability of desirable filler activities in proximity to the path (discussed below).

The utility function for computing desirability of an event is going to be empirically determined. The greater the value returned by the function, the more desirable is the event that was evaluated. The form of the function will be strongly dependent on the number and type of parameters in the party profile, the precise entries in the profile interpretation database 1200, the range of travel times possible within the facility, the range of queue times possible, along with a measure of judgement by the function designer who should be working in consultation, where appropriate, with the facility operators responsible for the visitor's experience.

The utility function determines the answer to questions like "Which is better: walking for ten minutes to stand in a five minute queue, or standing in a fifteen minute queue right here?" "Which is better, all other acceptance factors being equal: riding a three-year-old, $30M attraction, or seeing a one-year-old $15M stage show?"

As the utility function is designed for a facility, additional information about links and attractions may be added to their respective databases. Such additional information allows the utility function to make better, more meaningful decisions, "Which is better, walking for ten minutes along a beautiful, fragrant pathway with a scenic panorama set in the valley below to stand in a five minute queue, or standing in a fifteen minute queue right here?"

A convenient basis for constructing a utility function is the one-to-ten scale. A result of ten represents an attraction that makes the best possible (or best available) match to a party's profile, just a few steps away. A result of one represents the least alluring attraction that is not closed or forbidden, at the furthest node in the facility, and having to wait when you get there, and having the largest excess demand so as to have required a large negative perturbation to discourage that excess demand. If the one-to-ten scale is used, a result of zero is appropriate to attractions that are not open or are otherwise forbidden (e.g. an attraction requiring a special admission that the party does not possess.)

Once the utility function is run for temporary event 1540, the result is entered into desirability field 1528 in the temporary event.

If the desirability field 1528 of the temporary event is greater than the same field in the current event, then all the fields 1520–1532 of the temporary event 1540 are copied into the current event record.

If not previously terminated, step 1450 now concludes.

In step 1460, the next attraction not contained in the itinerary 1500 is sought. If one exists, the process loops back to step 1440. Steps 1440 and 1460 comprise the logic of a loop iteration over all the attractions in attraction database 1000.

If no further attractions remain to be examined, the processing continues at step 1470.

In step 1470, the last temporary event to have been copied into the current event is now the event that will be recorded.

If no such event exists, which would be indicated by a zero being recorded in the desirability field 1528 of the current event, then the itinerary has come to an end and the entering the facility exit as the final event is appropriate. This may occur if no further attractions remain that have not been experienced by the party, or because there is insufficient time to experience any more attractions. The attraction name recorded in field 1532 is "Exit", the location value is taken from the entry node field 1021 from the record for the "Exit" in attraction database 1000, and the exit location field 1531 is populated analogously. A value to be placed in the travel time field 1525 is calculated as previously described. A value for the queue time field 1527 of the current record is similarly retrieved from the queue field 1026 of the "Exit" record. The value stored in the party profile for departure time is placed in the showtime field 1529 of the current record.

In step 1480, if the attraction in the current event record is "Exit", then the itinerary is complete and the process 1400 continues with step 1490. Otherwise, the process loops to initialize and determine the next event by returning to step 1430. Steps 1430 and 1480 comprise the logic of a loop that generates events until the "Exit" event has been generated.

In step 1490, the itinerary is complete and ready for storage. Resources required by the itinerary generation process (e.g. access to databases) can be released. After this, the process 1400 is concluded.

Process 1400 will be recognized by those skilled in the are as a width-first locally-optimized search strategy. It will be obvious to those artists that some of the operations, such as determining the path having the shortest travel time are computationally expensive tasks. Further, it will be observed that the doubly nested loop makes the process presented into an o(n 2) problem. Both of these and other inefficiencies will be considered targets for optimization. It should be noted, however, that for small or moderate sized facilities such as the exemplary facility of map 800, the combinatorial issues are tractable with modern processor speeds. Some of the optimizations discussed in Libby, especially the binning techniques, are suitable for application to the itinerary generation process 1400.

It should be noted that the itinerary generation process proceeds monotonically forward, to create an ever longer itinerary. It may be appropriate, if processor speed is a limitation or the facility is so large as to be more complex than can be timely processed, to allow a party to proceed to their first event, even while the second or later events are being computed in the background. The capability and management of multitasking in this fashion are well known. Further, should a party miss an event, either because they ran late doing something else or otherwise elect to skip the current event, the portable computer 100 can set the remaining portion of the previous itinerary aside, and begin to generate a new itinerary with a different latter portion. All the events that were previously experienced would be retained, and process 1400 would be entered at step 1430, where the current event is the one that was missed or skipped. In this case, the previous time field 1522 of the current event is set to the current time-of-day and processing continues as previously described, including finding attractions already experienced by the party to be in the earlier (historical) portion of the itinerary 1500.

When in the course of presenting an itinerary having an event with a significant gap between the actual showtime in field 1529 and the sum of the previous time 1522, travel time 1525, and queue time 1527, the presentation of the itinerary can insert an unscheduled item as if it were a part of the itinerary. Such unscheduled items might include pseudo-events such as "<shopping>" or a "<photo opportunity>" or other activities which exist in proximity to the route planned from the previous event to the current event, and which are in agreement with the party profile.

Data suitable for generating such pseudo-events can be stored in a database very much like that of attraction database 1000. Selecting and evaluating desirable items from this database would be done in much the same manner as selecting attractions, and can use a database analogous to profile interpretation database 1200.

In association with pseudo-events such as "<shopping>", the facility operator may include marketing messages or special offers to be presented at an appropriate time, and under appropriate conditions. For instance, a buy-four-get-one-free offer for ice cream cones might be extended to a party having a size of five or more, that includes small children, and is passing near an ice cream vendor while not being in a rush to make it to the next event. Similarly, at a time appropriate to a "<lunch>" activity (n.b. preferred lunching time and duration is a suitable question whose answer may be incorporated into the party profile), a discount offer, or merely a restaurant recommendation, may appear that is for a restaurant which targets as its customers the demographic of the party.

In an embodiment where itinerary 1500 is generated by a computer having communication access to a reservation computer (for example, if the portable computer 100 has a wireless network capability), and the reservation computer is operated by or for a dining establishment, then an additional capability is created. The itinerary generating computer can request a reservation at the restaurant for the time of an event being considered in the itinerary. Prior to requesting the reservation, the attraction evaluation loop of steps 1440, 1450, and 1460 will have determined that if a reservation were to be available from this restaurant at (or near) this time, then dining at this restaurant would be the most desirable event available. If the reservation is available, then the event is entered into the itinerary and the reservation is kept. If the reservation is not available, then an attempt may be made to obtain a reservation at a different restaurant that would result in the next most desirable event. By ordering the requests for reservations from most desirable to least, the first reservation that is available is automatically the most desirable event possible.

In the case that dining establishments are treated as attractions, the utility function of step 1450 may be extended to include aggregated hunger (when did the party last eat?) and cuisine preferences into its metric.

Often, a group visiting a facility may wish to experience attractions separately, but later regroup for a meal. Subsequently, the group may break up again and continue to experience attractions and regroup again only at their departure time. Such a desire can be accommodated by generating for each party the group breaks into, a first itinerary to which terminates at the common meal event (e.g. "<lunch>", as if it were the "Exit" event previously discussed. Thus, all first itineraries converge at the same meal event. A second itinerary is also generated for each party. The second itinerary picks up after the common meal event, but the generation of subsequent events retains the history of the events of the first itinerary, so that attractions are not duplicated. The second itineraries converge at the common departure time.

While the preferred embodiment is discussed in the context of present day displays and touchscreens, it is contemplated that other modes of output and input will be suitable as they are made available. For instance, a portable computer 100 might make use of spoken questions and speech recognition input to gather the information of steps 712 & 714. The next event indicated on an itinerary form 400 by next event banner 420, might instead be announced audibly in the language of the party's preference.

The particular implementations described, and the discussions regarding details, and the specifics of the figures included herein, are purely exemplary; these steps and the examples of them, may be modified, rearranged and/or enhanced without departing from the principles of the present invention.

The performance of the present invention will vary from facility to facility. However, the principles of the present invention can be used on any commercially available computer with sufficient power.

The particular features of the user interface and the performance of the application, will depend on the architecture used to implement a system of the present invention, the operating system of the computers selected, and the software code written. It is not necessary to describe the details of such programming to permit a person of ordinary skill in the art to implement an application and user interface suitable for incorporation in a computer system within the scope of the present invention. The details of the software design and programming necessary to implement the principles of the present invention are readily understood from the description herein.

The preferred embodiments of the present invention incorporate a variety of different data structures and procedures. It is understood that flexibility in performing user-guided tasks involving these various data structures and procedures is incorporated as a part of the present invention.

Although the structure and operation of the present invention has been described in connection with facilities of a scale such as those listed, it is not intended that the invention be so limited. By employing the optimized algorithms known in the art (e.g. Libby) or applying sufficiently powerful computers to the task, the present invention can be scaled to handle itineraries that cover attractions spread over a whole city (e.g. downtown San Francisco, or Los Angeles, downtown near the Convention Center), a region (e.g. California's Napa and Sonoma wine country), state (e.g. all of California), or a country (e.g. Italy) can be generated.

Various additional modifications of the described embodiments of the invention specifically illustrated and described herein will be apparent to those skilled in the art, particularly in light of the teachings of this invention. It is intended that the invention cover all modifications and embodiments which fall within the spirit and scope of the invention. Thus, while preferred embodiments of the present invention have been disclosed, it will be appreciated that it is not limited thereto but may be otherwise embodied within the scope of the following claims.

We claim as our invention:

1. A system for providing an itinerary to a party, said itinerary comprising a second set of attractions selected from a first set of attractions, said system comprising:
   data regarding said first set of attractions;
   information about said party, at least a portion of said information distinguishing among said first set of attractions with respect to said data;
   a computer having access to said data and said information, said computer having software that selects said second set of attractions from said first set of attractions, said second set of attractions consisting of at least some of said first set of attractions for which said data substantially matches with said information;
   a presentation means in communication with said computer, said presentation means able to receive said itinerary from said computer and present said itinerary to said party,
   whereby said itinerary is customized for said party.

2. A method of providing an itinerary to a party, said itinerary comprising a second set of attractions selected from a first set of attractions, said method comprising the steps of:
   a) providing data regarding said first set of attractions;
   b) gathering information about said party, at least a portion of said information distinguishing among said first set of attractions with respect to said data;
   c) providing a computer having access to said data and said information, said computer having software operable to select said second set of attractions from said first set of attractions;
   d) selecting said second set of attractions with said software such that said second set of attractions comprises at least one of said first set of attractions for which said data substantially matches with said information;
   e) providing a presentation means able to receive said itinerary from said computer; and,
   f) presenting said itinerary to said party using said presentation means;
   wherein said information comprises an aversion attribute of said party and a corresponding nullifying preference of said party, wherein said data distinguishes a portion of said first set of attractions as being less desirable with respect to said aversion attribute unless said corresponding nullifying preference is present, and wherein in step d) at least one attraction from said portion of said first set of attractions is selected for said second set of attractions;
   whereby said itinerary is customized for said party.

3. A method of providing an itinerary to a party, said itinerary comprising a second set of attractions selected from a first set of attractions, said method comprising the steps of:
   a) providing data regarding said first set of attractions;
   b) gathering information about said party, at least a portion of said information distinguishing among said first set of attractions with respect to said data;
   c) providing a computer having access to said data and said information, said computer having software that selects said second set of attractions from said first set of attractions;
   d) selecting said second set of attractions with said software such that said second set of attractions comprises at least one of said first set of attractions for which said data substantially matches with said information;
   e) providing a presentation means able to receive said itinerary from said computer; and,
   f) presenting said itinerary to said party using said presentation means;
   whereby said itinerary is customized for said party.

4. The method of claim 3 wherein said information comprises a preference of said party; wherein said data distinguishes a portion of said first set of attractions as being more desirable with respect to said preference, and wherein in step d) at least one attraction from said portion of said first set of attractions is selected for said second set of attractions.

5. The method of claim 3 wherein said information comprises an attribute of said party, wherein said data distinguishes a portion of said first set of attractions as being more desirable with respect to said attribute, and wherein in step d) at least one attraction from said portion of said first set of attractions is selected for said second set of attractions.

6. The method of claim 3 wherein said information comprises an aversion attribute of said party, wherein said data distinguishes a portion of said first set of attractions as being less desirable with respect to said aversion attribute, and wherein in step d) said portion of said first set of attractions is excluded from selection for said second set of attractions.

7. The method of claim 3 wherein said information comprises a privilege of said party, wherein said data distinguishes a portion of said first set of attractions as being more desirable with respect to said privilege, and wherein in step d) at least one attraction from said portion of said first set of attractions is selected for said second set of attractions.

8. The method of claim 3 wherein said data further comprises a scheduled time corresponding to a first attraction of said second set of attractions, wherein in step d) said software adds said scheduled time in association with said first attraction to said itinerary, and wherein step f) further includes presenting said scheduled time in association with said first attraction.

9. The method of claim 3 in which said party and a second party are a group,
said second party having a second itinerary comprising a first attraction of said first set of attractions, said first attraction further in association with a second scheduled time,
said information further representing a desire to regroup said group,
wherein in step d) said software selects said first attraction and a scheduled time, said scheduled time being substantially equal to said second scheduled time, in response to said desire in said information,
whereby said desire to regroup is accommodated.

10. The method of claim 3 wherein in step d) said software further adds to said itinerary a first scheduled time corresponding to a first attraction of said second set of attractions, and adds a second scheduled time corresponding to a second attraction of said second set of attractions, said first scheduled time and said second scheduled time being selected so that said second scheduled time is at least equal to said first scheduled time plus a time required between attractions,
whereby said second attraction is scheduled to follow said first attraction.

11. The method of claim 3, wherein said information comprises a third set of attractions previously selected for said party, said third set consisting of an already visited portion and a remaining portion,
wherein said party forgoes said remaining portion due to an interruption,
wherein in step d) said software selects said second set of attractions as a replacement for said remaining portion, and wherein said second set of attractions substantially excludes said already visited portion,
whereby said interruption is overcome.

12. The method of claim 3, wherein said first set of attractions comprises a plurality of attractions selected from the group consisting of ride, show, movie, theater, restaurant, exhibit, display, presentation, store, tour, parade, museum, room, area, fountain, restroom, hiking trail, picnic site, autograph session, historic recreation, beach, viewpoint, photo opportunity, lookout, fireworks display, attraction within a district, attraction within a city, attraction within a region, attraction within a state, and attraction within a country.

13. The method of claim 3 further comprising the steps of:
g) providing an access control system to a first attraction of said second set of attractions; and,
h) admitting said party to said first attraction with said access control system, said access control system operating in response to at least a portion of said itinerary corresponding to said first attraction.

14. The method of claim 3 wherein said computer comprises at least a first member selected from the group consisting of a portable computer, a handheld computer, a kiosk computer, a general purpose computer, and a desktop computer.

15. The method of claim 3 wherein said presentation means comprises a printer and in step f) at least a portion of said itinerary is presented in a printed form.

16. The method of claim 3 wherein said presentation means comprises a display selected from the group consisting of a screen, a touchscreen, and a scrolling display.

17. The method of claim 3 wherein in step f) at least a portion of said itinerary is announced audibly by said presentation means.

18. The method of claim 3 further comprising the step of:
g) providing a reservation computer in communication with said computer, said reservation computer providing an indication whether said a first attraction is available;
wherein in step d) said software excludes said first attraction from said second set of attractions when said reservation computer indicates said first attraction is unavailable.

19. The method of claim 3 wherein said data indicates a first attraction of said first set of attractions, said first attraction having excessive demand, and wherein said software is less likely to select said first attraction in step d), whereby demand for said first attraction is moderated.

20. The method of claim 3 further comprising the steps of:
g) providing a storage accessible to said computer; and,
h) recording at least a portion of said itinerary corresponding to a first attraction of said first set of attractions in said storage, thereby accumulating in said storage a directed demand corresponding to at least said first attraction.

21. The method of claim 3 further comprising the steps of:
g) providing a reservation computer in communication with said software; and,
h) making a reservation with said reservation computer for said party for a first attraction of said second set of attractions;
whereby said reservation for said party is accessible to users of said reservation computer.

22. The method of claim 3 wherein in step d) said software applies a perturbation to a desirability of a first attraction of said first set of attractions, said perturbation producing a different result for said second set, thereby redistributing a directed demand corresponding to said first attraction to mitigate at least one selected from the group consisting of underutilization of said first attraction, excessive demand for said first attraction.

23. The method of claim 3, wherein said data further comprises a first set of messages, each of said first set of messages selected from the group consisting of a marketing message, a discount offer, and a recommendation, each of said first set of messages having corresponding conditions, each of said first set of messages being associated with a corresponding first attraction of said first set of attractions,
said software being further able to determine whether said conditions are met,
said itinerary further comprising a second set of messages,
said method further comprising the step of:
g) selecting said second set of messages with said software such that said second set of messages consists of at least one of said first set of messages for which the corresponding conditions are met;

wherein in step f) each of said second set of messages is provided to said party in conjunction with said itinerary;

whereby each of said second set of messages message is available at an appropriate time.

24. The method of claim 3, wherein said software comprises a decision making routine responsive to at least a portion of said data corresponding to a first attraction of said first set of attractions and at least a portion of said information, said decision making routine performing at least a portion of step d) with respect to said first attraction.

25. The method of claim 3, wherein a portion of said data corresponding to a first attraction of said first set of attractions is representative of at least one member of the group consisting of expected queue length, actual queue length, expected attendance, location of an entrance, location of an exit, showtime, mode of operation, routes to other attractions of said first set of attractions, routes from said other attractions, travel time to said other attractions, capacity, theoretical hourly ride capacity, holding capacity, duration, continuous running, availability, a scheduling factor, an acceptance factor, an admission requirement, an admission class, an admission grade, operating hours, inoperation, and wheelchair accessibility.

* * * * *